United States Patent
Wozniak et al.

(10) Patent No.: US 10,218,952 B2
(45) Date of Patent: Feb. 26, 2019

(54) ARCHITECTURE FOR RENDERING HIGH DYNAMIC RANGE VIDEO ON ENHANCED DYNAMIC RANGE DISPLAY DEVICES

(71) Applicant: Microsoft Technology Licensing, LLC, Redmond, WA (US)

(72) Inventors: Matthew Wozniak, Bellevue, WA (US); Mehmet Kucukgoz, Seattle, WA (US); Abhijit Sarkar, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/385,711

(22) Filed: Dec. 20, 2016

(65) Prior Publication Data

US 2018/0152684 A1 May 31, 2018

Related U.S. Application Data

(60) Provisional application No. 62/426,990, filed on Nov. 28, 2016.

(51) Int. Cl.
*G06T 5/00* (2006.01)
*H04N 9/67* (2006.01)
(Continued)

(52) U.S. Cl.
CPC .............. *H04N 9/67* (2013.01); *G06T 5/007* (2013.01); *H04N 5/20* (2013.01); *H04N 5/765* (2013.01);
(Continued)

(58) Field of Classification Search
CPC ......... G09G 3/2007; G09G 2300/0465; G09G 2207/20208
See application file for complete search history.

(56) References Cited

U.S. PATENT DOCUMENTS 7,433,514 B2    10/2008    Sloan
7,492,375 B2    2/2009    Toyama et al.
(Continued)

FOREIGN PATENT DOCUMENTS

EP            3136375        3/2017
WO    WO 2012/125802    9/2012
(Continued)

OTHER PUBLICATIONS

Korshunov et al., "A JPEG Backward-compatible HDR Image Compression," Int'l Society for Optics and Photonics, 12 pp. (Oct. 2012).

(Continued)

*Primary Examiner* — Antonio A Caschera
(74) *Attorney, Agent, or Firm* — Klarquist Sparkman, LLP

(57) ABSTRACT

Innovations in rendering of high dynamic range ("HDR") video on a display device having enhanced dynamic range ("EDR"). The peak brightness for an EDR display device is lower than the peak brightness for a typical HDR display device but higher than the peak brightness for a typical display device having standard dynamic range. The increased range of brightness values in an EDR display device can be utilized effectively to show bright highlights of the HDR video. For example, decision logic is configured to evaluate a peak brightness of a target display device and select an HDR-to-EDR tone mapping mode. A tone mapper is configured to apply tone mapping to input values for the sample values of HDR video, according to a tone mapping function, thereby producing output values for sample values of EDR video.

20 Claims, 11 Drawing Sheets

(51) Int. Cl.

| | |
|---|---|
| H04N 7/14 | (2006.01) |
| H04N 7/15 | (2006.01) |
| H04N 11/24 | (2006.01) |
| H04N 5/20 | (2006.01) |
| H04N 5/765 | (2006.01) |
| H04N 9/68 | (2006.01) |

(52) U.S. Cl.
CPC ............... *H04N 7/147* (2013.01); *H04N 7/15* (2013.01); *H04N 11/002* (2013.01); *G06T 2207/10016* (2013.01); *G06T 2207/20208* (2013.01); *H04N 9/68* (2013.01)

(56) References Cited

U.S. PATENT DOCUMENTS

| | | | |
|---|---|---|---|
| 7,953,286 | B2 | 5/2011 | Chiang et al. |
| 7,983,502 | B2 | 7/2011 | Cohen et al. |
| 8,014,445 | B2 | 9/2011 | Segall et al. |
| 8,218,625 | B2 | 7/2012 | Ward et al. |
| 8,248,486 | B1 | 8/2012 | Ward et al. |
| 8,330,768 | B2 | 12/2012 | Mantiuk et al. |
| 8,355,595 | B2 | 1/2013 | Bressan |
| 8,433,150 | B2 | 4/2013 | Yuan et al. |
| 8,593,480 | B1 | 11/2013 | Ballestad et al. |
| 8,606,009 | B2 | 12/2013 | Sun |
| 8,964,060 | B2 | 2/2015 | Levoy et al. |
| 9,064,313 | B2 | 6/2015 | Seshadrinathan et al. |
| 9,076,224 | B1 | 7/2015 | Shah et al. |
| 9,087,391 | B2 | 7/2015 | Geiss et al. |
| 9,406,112 | B2 | 8/2016 | Banterle et al. |
| 9,497,380 | B1 | 11/2016 | Jannard et al. |
| 9,576,555 | B2 | 2/2017 | Ninan et al. |
| 9,712,816 | B2 | 7/2017 | Garbas et al. |
| 9,741,099 | B2 | 8/2017 | Lim et al. |
| 2005/0104900 | A1 | 5/2005 | Toyama et al. |
| 2005/0117799 | A1 | 6/2005 | Fuh et al. |
| 2007/0035706 | A1 | 2/2007 | Margulis |
| 2007/0201560 | A1 | 8/2007 | Segall et al. |
| 2007/0269132 | A1 | 11/2007 | Duan et al. |
| 2008/0068472 | A1 | 3/2008 | Zhou |
| 2009/0167672 | A1 | 7/2009 | Kerofsky |
| 2011/0095875 | A1 | 4/2011 | Thyssen et al. |
| 2011/0188744 | A1 | 8/2011 | Sun |
| 2011/0194618 | A1 | 8/2011 | Gish et al. |
| 2011/0255101 | A1 | 10/2011 | Edge |
| 2012/0057803 | A1 | 3/2012 | Wakazono |
| 2012/0081385 | A1 | 4/2012 | Cote et al. |
| 2012/0081566 | A1 | 4/2012 | Cote et al. |
| 2012/0081577 | A1 | 4/2012 | Cote et al. |
| 2012/0147593 | A1 | 6/2012 | El-mahdy et al. |
| 2012/0147953 | A1 | 6/2012 | El-mahdy et al. |
| 2012/0218442 | A1 | 8/2012 | Jandhyala et al. |
| 2012/0314944 | A1 | 12/2012 | Ninan et al. |
| 2013/0038790 | A1 | 2/2013 | Seetzen et al. |
| 2013/0083838 | A1 | 4/2013 | Touze et al. |
| 2013/0120656 | A1 | 5/2013 | Wilson et al. |
| 2013/0155330 | A1 | 6/2013 | Longhurst et al. |
| 2013/0241931 | A1 | 9/2013 | Mai et al. |
| 2014/0002694 | A1 | 1/2014 | Levy et al. |
| 2014/0092012 | A1 | 4/2014 | Seshadrinathan et al. |
| 2014/0210847 | A1 | 7/2014 | Knibbeler et al. |
| 2014/0229875 | A1 | 8/2014 | Li et al. |
| 2014/0241418 | A1 | 8/2014 | Garbas et al. |
| 2014/0368557 | A1 | 12/2014 | Bastani |
| 2015/0078661 | A1 | 3/2015 | Granados et al. |
| 2015/0117791 | A1 | 4/2015 | Mertens |
| 2015/0169204 | A1 | 6/2015 | DeSelaers et al. |
| 2015/0243200 | A1 | 8/2015 | Pan |
| 2015/0243243 | A1 | 8/2015 | Greenebaum et al. |
| 2015/0341611 | A1 | 11/2015 | Oh et al. |
| 2015/0350513 | A1 | 12/2015 | Zhang et al. |
| 2015/0358646 | A1 | 12/2015 | Mertens |
| 2016/0005349 | A1 | 1/2016 | Atkins et al. |
| 2016/0080716 | A1* | 3/2016 | Atkins ............... H04N 5/44504 348/599 |
| 2016/0125580 | A1 | 5/2016 | He |
| 2016/0134853 | A1 | 5/2016 | Gish et al. |
| 2016/0241829 | A1 | 8/2016 | Qu et al. |
| 2016/0248939 | A1 | 8/2016 | Thurston, III et al. |
| 2016/0255356 | A1 | 9/2016 | Strom et al. |
| 2016/0269676 | A1 | 9/2016 | Yamamoto et al. |
| 2016/0286226 | A1 | 9/2016 | Ridge et al. |
| 2016/0300537 | A1 | 10/2016 | Hoffman et al. |
| 2016/0309154 | A1 | 10/2016 | Rusanovskyy et al. |
| 2016/0345017 | A1 | 11/2016 | Lasserre et al. |
| 2016/0360174 | A1 | 12/2016 | Tao et al. |
| 2016/0381335 | A1 | 12/2016 | Tao et al. |
| 2016/0381363 | A1 | 12/2016 | Tao et al. |
| 2017/0026646 | A1 | 1/2017 | Minoo et al. |
| 2017/0085880 | A1 | 3/2017 | Minoo et al. |
| 2017/0085895 | A1 | 3/2017 | Gu et al. |
| 2017/0103729 | A1 | 4/2017 | Huang et al. |
| 2017/0140513 | A1 | 5/2017 | Su et al. |
| 2017/0272690 | A1 | 9/2017 | Seifi et al. |
| 2017/0339433 | A1 | 11/2017 | Mertens |
| 2018/0007356 | A1* | 1/2018 | Kadu ............... H04N 19/126 |

FOREIGN PATENT DOCUMENTS

| | | |
|---|---|---|
| WO | WO 2015/036358 | 3/2015 |
| WO | WO 2015/130793 | 9/2015 |
| WO | WO 2016/020189 | 2/2016 |
| WO | WO 2016/049327 | 3/2016 |
| WO | WO 2016/120108 | 8/2016 |
| WO | WO 2016/124451 | 8/2016 |
| WO | WO 2016/192937 | 12/2016 |

OTHER PUBLICATIONS

Le Pendu, "Backward Compatible Approaches for the Compression of High Dynamic Range Videos," downloaded from World Wide Web, 2 pp. (Mar. 2016).

Mantiuk et al., "Backward Compatible High Dynamic Range MPEG Video Compression," *ACM Trans. on Graphics*, vol. 25, No. 3, 11 pp. (Jul. 2006).

Shahid et al., "A New Hybrid Tone Mapping Scheme for High Dynamic Range (HDR) Videos," *IEEE Int'l Conf. on Consumer Electronics*, pp. 351-352 (Jan. 2015).

Touze et al., "HDR Video Coding Based on Local LDR Quantization," *Int'l Conf. and SME Workshop no HDR Imaging*, 6 pp. (Mar. 2014).

"Adobe Photoshop CC Help," pp. 431-433 (document marked "last updated Jun. 19, 2016").

Boitard et al., "Temporal Coherency for Video Tone Mapping," *Proc. SPIE Applications of Digital Image Processing*, vol. 8499, 10 pp. (Oct. 2012).

Dersch, "Interactive Java Viewer for HDR-panoramas," downloaded from the World Wide Web, 6 pp. (Dec. 2003).

Guthier et al., "Flicker Reduction in Tone Mapped High Dynamic Range Video," *Proc. SPIE Color Imaging*, vol. 7866, 15 pp. (Jan. 2011).

Hart, "UHD Color for Games," Version 1.0, 41 pp. (Jun. 2016).

International Search Report and Written Opinion dated Jan. 30, 2018, from International Patent Application No. PCT/US2017/062659, 13 pp.

Kiser et al., "Real Time Automated Tone Mapping System for HDR Video," *IEEE Int'l Conf. on Image Processing*, 4 pp. (Sep. 2012).

Mantiuk et al., "Display Adaptive Tone Mapping," *ACM Trans. on Graphics*, vol. 27, No. 3, 10 pp. (Aug. 2008).

Meylan, "High Dynamic Range Image Rendering With a Retinex-Based Adaptive Filter," *IEEE Transactions on Image Processing*, vol. 15, No. 9, pp. 2820-2830 (2006).

Meylan, "Tone Mapping for High Dynamic Range Images," Ph.D. Thesis, Federal Institute of Technology in Lausanne, 175 pp. (Jul. 2006).

International Search Report and Written Opinion dated Mar. 14, 2018, from International Patent Application No. PCT/US2017/062660, 18 pp.

(56) References Cited

OTHER PUBLICATIONS

International Search Report and Written Opinion dated Apr. 24, 2018, from International Patent Application No. PCT/US2018/014601, 16 pp.
Non-Final Office Action dated Jul. 17, 2018, from U.S. Appl. No. 15/385,750, 19 pp.
Non-Final Office Action dated Jan. 31, 2018, from U.S. Appl. No. 15/385,750, 18 pp.
Non-Final Office Action dated Sep. 18, 2017, from U.S. Appl. No. 15/418,522, 31 pp.
Non-Final Office Action dated Sep. 7, 2017, from U.S. Appl. No. 15/418,530, 25 pp.
Melo et al., "Context-aware HDR Video Distribution for Mobile Devices," *Multimedia Tools and Applications,* vol. 76, No. 15, pp. 16605-16623 (Sep. 2016).
Melo, "High Dynamic Range Video for Mobile Devices," Ph.D. Thesis in Computer Science, Universidade de Tras-Os-Montes E Alto Douro, Portugal, 136 pp. (2015).
Melo et al., "Screen Reflections Impact on HDR Video Tone Mapping for Mobile Devices: an Evaluation Study," *EURASIP Journal on Image and Video Processing,* pp. 1-136 (Dec. 2015).

\* cited by examiner software 180 implementing one or more innovations for rendering of HDR video on an EDR display device

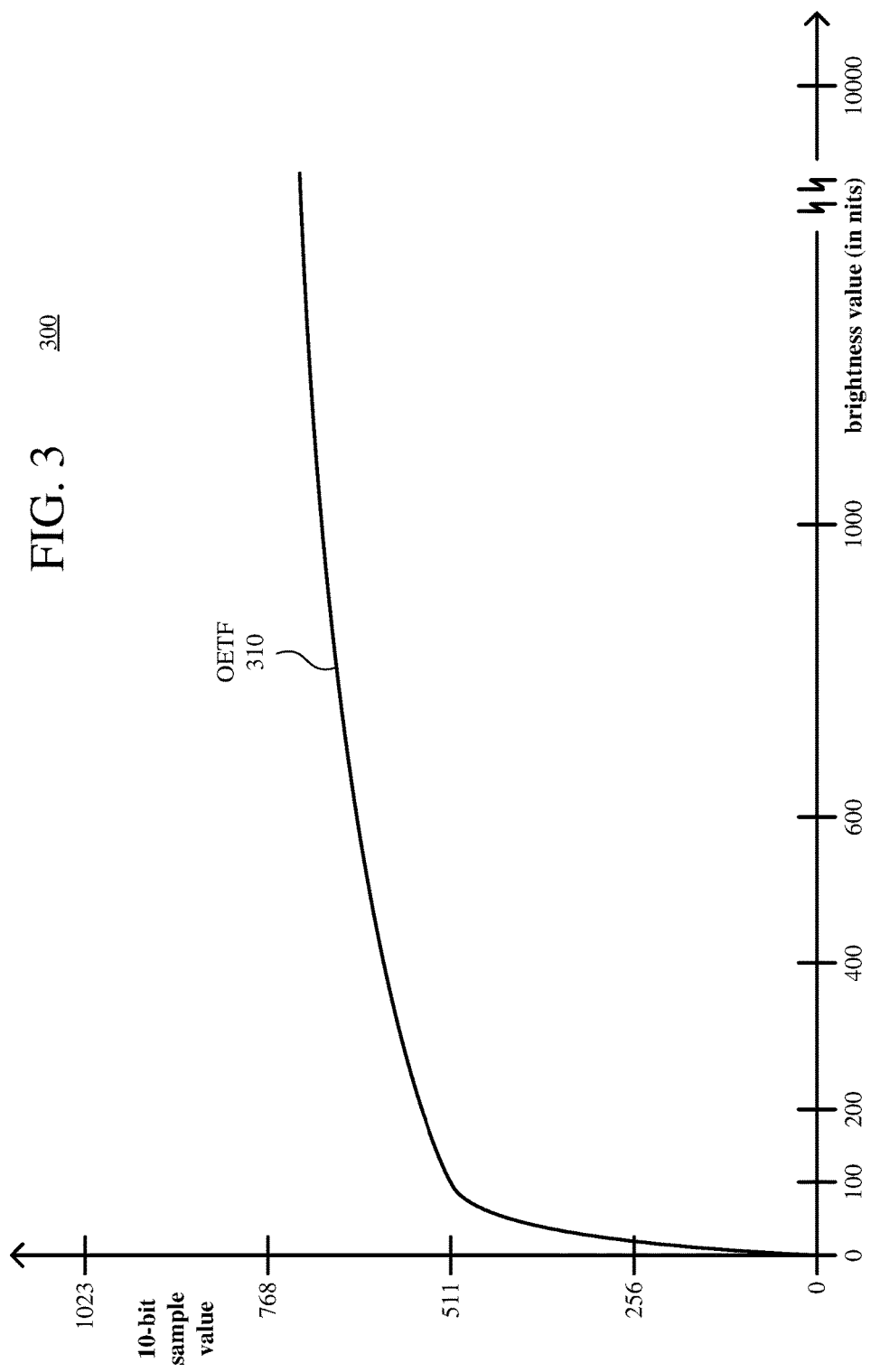

FIG. 5    500
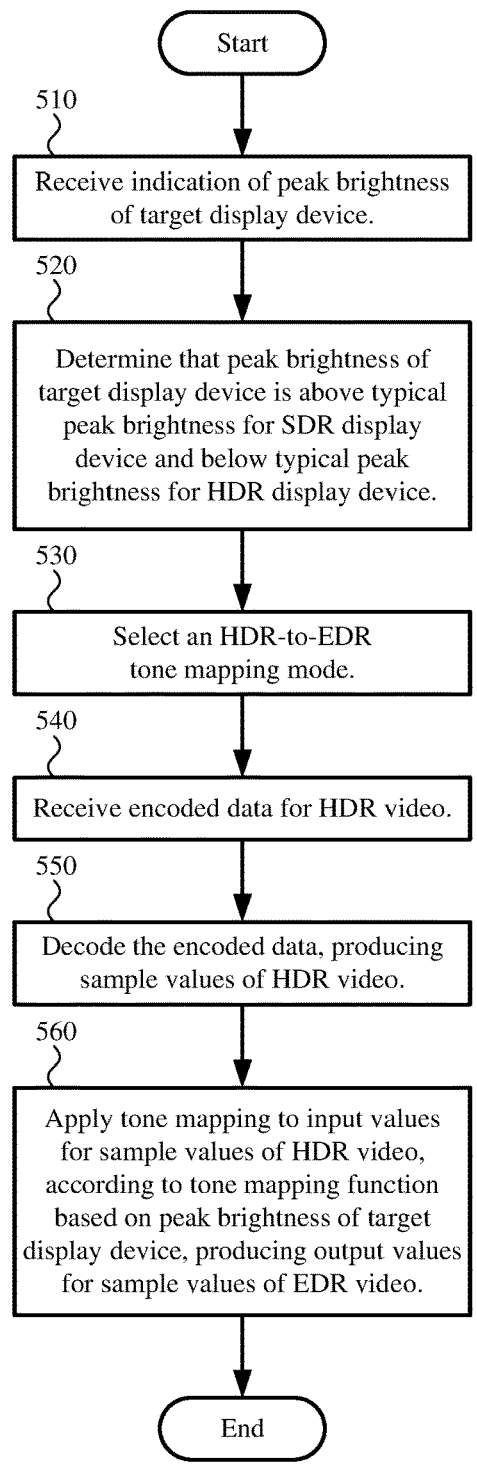

ARCHITECTURE FOR RENDERING HIGH DYNAMIC RANGE VIDEO ON ENHANCED DYNAMIC RANGE DISPLAY DEVICES

CROSS REFERENCE TO RELATED APPLICATIONS

This application claims the benefit of U.S. Provisional Patent Application No. 62/426,990, filed Nov. 28, 2016, the disclosure of which is hereby incorporated by reference.

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

For standard dynamic range ("SDR"), digital video represents common colors in a relatively narrow range of brightness. Brightness can be measured in candelas per square meter ($cd/m^2$), which indicates luminous intensity per unit area. This unit of luminous intensity per unit area is called a "nit." A typical SDR display device may represent colors from pale colors through colors that are relatively vivid, in a brightness range from 0 nits to 100 nits. More recently, display devices having high dynamic range ("HDR") have been introduced. A typical HDR display device may represent colors in a wider color gamut (potentially representing colors that are more vivid or saturated) and in a larger brightness range (e.g., up to 1500 nits or 4000 nits). Video produced for playback on an HDR display device can have an even larger brightness range (e.g., 0 nits to 10,000 nits).

When HDR video content is played back on an SDR display device, details in moderately bright values and very bright values are lost. For example, brightness values above a certain threshold (e.g., 100 nits) are clipped to the brightest value possible for the SDR display device, or brightness values above a certain threshold (e.g., 95 nits) are compressed to a very small range, so that a very wide range of bright values in the HDR video is represented with a small range of values on the SDR display device. Recently, some display devices have an enhanced dynamic range ("EDR") that, compared to a typical SDR display device, supports a larger range of brightness values (e.g., up to 400 nits or 600 nits). The increase in range of brightness values can be called "brightness headroom." To date, the brightness headroom of EDR display devices is not exploited efficiently when rendering HDR video.

SUMMARY

In summary, the detailed description presents innovations in rendering of high dynamic range ("HDR") video on a display device having enhanced dynamic range ("EDR"). The peak brightness for an EDR display device is lower than the peak brightness for a typical HDR display device (e.g., 1500 nits, 4000 nits) but higher than the peak brightness for a typical display device having standard dynamic range ("SDR") (e.g., 100 nits). In some example implementations, the increased range of brightness values in an EDR display device, compared to a typical SDR display device, can be utilized effectively to show bright highlights of the HDR video.

According to one aspect of the innovations described herein, a computer system implements a video playback system that includes decision logic, a streaming controller, an input buffer, a video decoder, and a tone mapper. The decision logic is configured to receive an indication of a peak brightness of a target display device, and determine if the peak brightness of the target display device is above a typical peak brightness for an SDR display device (e.g., 100 nits) and below a typical peak brightness for an HDR display device (e.g., 1500 nits). The decision logic is further configured to select an HDR-to-EDR tone mapping mode in this case. The streaming controller is configured to request encoded data for HDR video (e.g., from a Web server or other media server, from a magnetic disk, from optical storage media, or from non-volatile memory). The input buffer is configured to store the encoded data, and the video decoder is configured to decode the encoded data, thereby producing sample values of HDR video. The tone mapper is configured to apply tone mapping to input values for the sample values of HDR video, according to a tone mapping function, thereby producing output values for sample values of EDR video.

In some example implementations, the tone mapping function is based at least in part on the peak brightness of the target display device and peak brightness of HDR video. The tone mapping function can also be based at least in part on metadata provided by the video decoder, an indication of ambient light in an environment around the target display device, content type of the sample values of HDR video, and/or analysis of the content of the sample values of HDR video.

Example HDR-to-EDR tone mapping functions are specified according to another aspect of the innovations described herein. For example, a tone mapper is configured to apply tone mapping to input values for the sample values of HDR video, according to a tone mapping function, thereby producing output values for sample values of EDR video. A first segment of the tone mapping function begins at a minimum point, ends at a first switch point, and maps input values along the first segment to output values along the first segment according to a first non-linear mapping. For example, the input values along the first segment are boosted according to the first non-linear mapping while range of the input values along the first segment is expanded. A second segment of the tone mapping function begins at the first switch point, ends at a second switch point, and maps input values along the second segment to output values along the second segment according to a linear mapping. For example, the input values along the second segment are boosted by an offset according to the linear mapping. A third segment of the tone mapping function begins at the second switch point, ends at a maximum point, and maps input values along the third segment to output values along the third segment according to a second non-linear mapping. For example, at least some of the input values along the third segment are boosted according to the second non-linear mapping while range of the input values along the third segment is compressed. Various parameters of the tone mapping function (e.g., maximum point, first switch point, second switch point) can be set based at least in part on a peak brightness of a target display device.

The video playback system can also include a first color converter before the tone mapper and second color converter after the tone mapper. For example, the first color converter is configured to convert the sample values of HDR video from an initial color space (e.g., a YUV-type color space) to an intermediate color space (e.g., a perceptually uniform, hue linear color space such as IPT), thereby producing intensity values and color values in the intermediate color space. The intensity values in the intermediate color space are the input values for the tone mapping. The color values in the intermediate color space can be selectively adjusted depending on a ratio of original intensity value to tone-mapped intensity value. The second color converter is configured to convert the tone-mapped intensity values (output values from the tone mapping) and the color values (possibly adjusted) from the intermediate color space to a final color space (e.g., an RGB-type color space) for the sample values of EDR video.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 3 is a diagram illustrating an example opto-electrical transfer function for HDR video.

FIG. 5 is a flowchart illustrating a generalized technique for rendering of HDR video on an EDR display device.

DETAILED DESCRIPTION

The detailed description presents innovations in rendering of high dynamic range ("HDR") video on a display device having enhanced dynamic range ("EDR"). The peak brightness for an EDR display device is lower than the peak brightness for a typical HDR display device (e.g., 1500 nits, 4000 nits) but higher than the peak brightness for a typical display device having standard dynamic range ("SDR") (e.g., 100 nits). In some example implementations, the increased range of brightness values in an EDR display device, compared to a typical SDR display device, can be utilized effectively to show bright highlights of the HDR video.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

Figure 1:
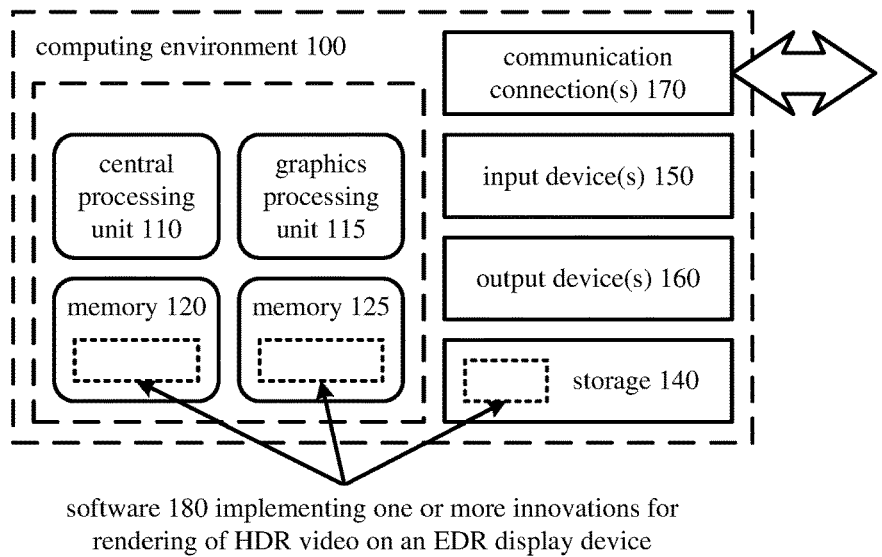
FIG. 1 is a diagram illustrating an example computer system in which some described embodiments can be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations for rendering of HDR video on an EDR display device, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations for rendering of HDR video on an EDR display device.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a computer monitor, television screen, or other display device, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine," "select," and "receive" to describe computer operations in a computer system. These terms are high-level abstractions for operations performed by a computer, and should not be confused with acts performed by a human being. The actual computer operations corresponding to these terms vary depending on implementation.

II. Example Network Environments.

Figure 2A:
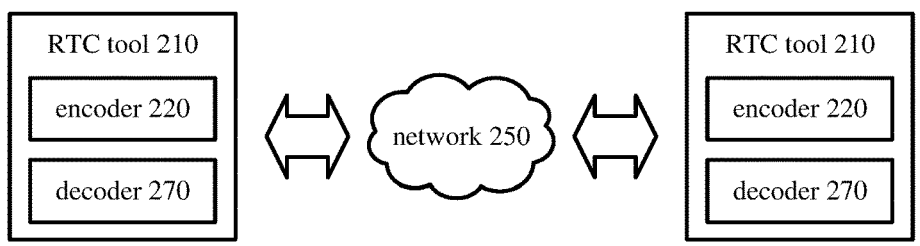
FIGS. 2a and 2b are diagrams illustrating example network environments in which some described embodiments can be implemented.
Figure 2B:
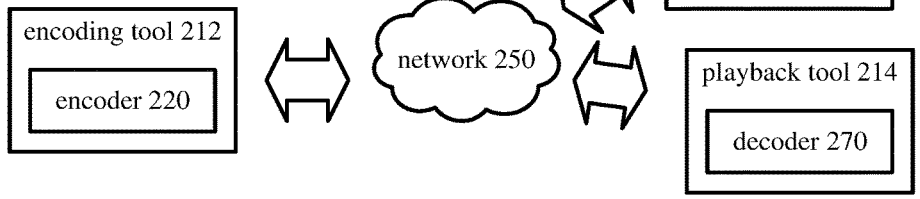

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the H.265/HEVC standard, ISO/IEC 14496-10 standard (also known as H.264/AVC), another standard, or a proprietary format such as VP8 or VP9, or a variation or extension thereof, with a corresponding decoder (270) accepting and decoding encoded data from the encoder (220). The bidirectional communication can be part of a video conference, video telephone call, or other two-party or multi-party communication scenario. Although the network environment (201) in FIG. 2a includes two RTC tools (210), the network environment (201) can instead include three or more RTC tools (210) that participate in multi-party communication.

Figure 4:
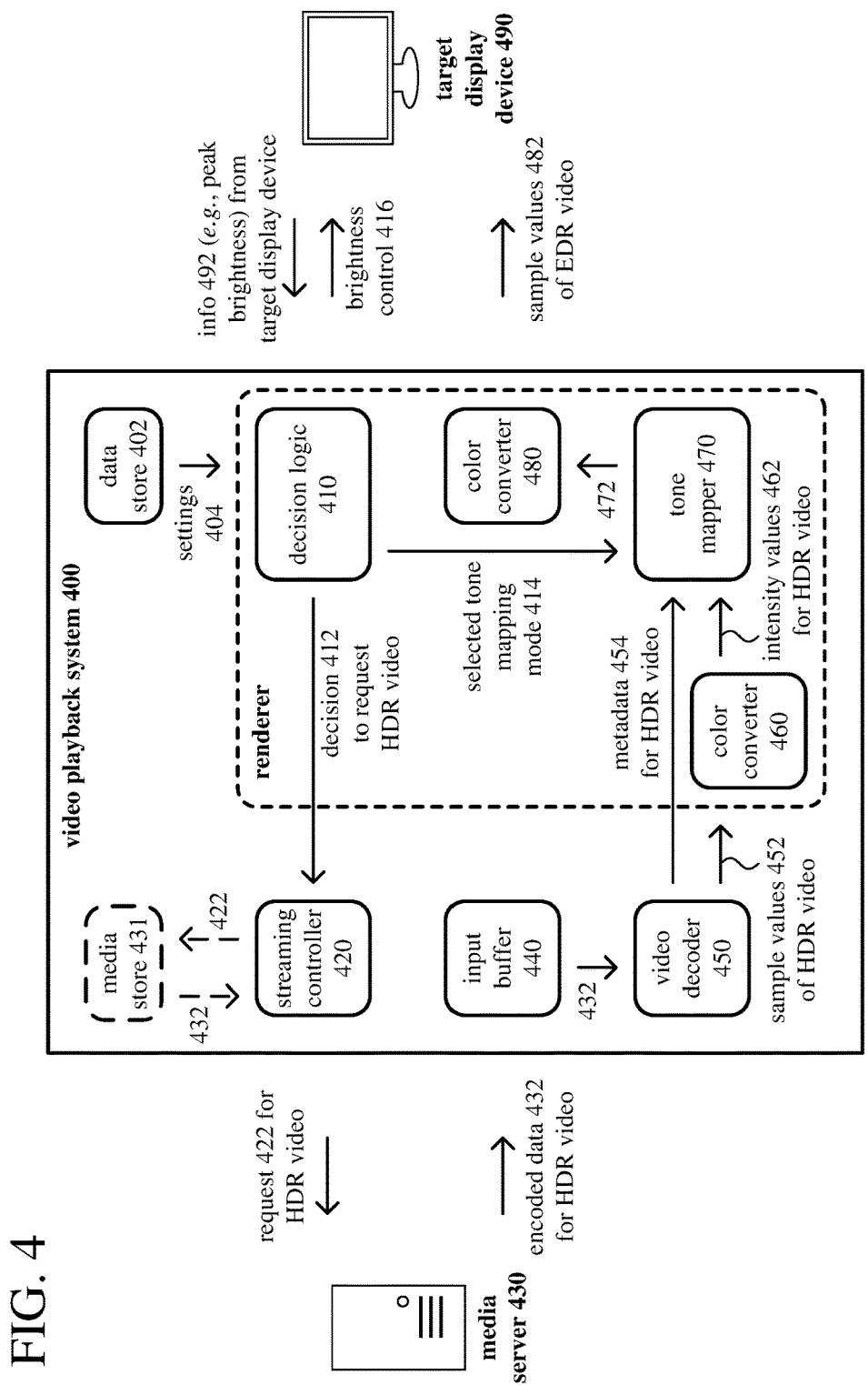
FIG. 4 is a diagram illustrating an example architecture for rendering of video on a target display device.

An RTC tool (210) manages encoding by an encoder (220) and also manages decoding by a decoder (270). FIG. 4 shows an example video playback system (400) that can be included in the RTC tool (210). Alternatively, the RTC tool (210) uses another video playback system.

In the network environment (202) shown in FIG. 2b, an encoding tool (212) includes an encoder (220) that encodes video for delivery to multiple playback tools (214), which include decoders (270). The unidirectional communication can be provided for live broadcast video streaming, a video surveillance system, web camera monitoring system, remote desktop conferencing presentation or sharing, wireless screen casting, cloud computing or gaming, or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can include server-side controller logic for managing connections with one or more playback tools (214). A playback tool (214) can include client-side controller logic for managing connections with the encoding tool (212). FIG. 4 shows an example video playback system (400) that can be included in the playback tool (214). Alternatively, the playback tool (214) uses another video playback system.

Alternatively, a Web server or other media server can store encoded video for delivery to one or more playback tools (214), which include decoders (270). The encoded video can be provided, for example, for on-demand video streaming, broadcast, or another scenario in which encoded video is sent from one location to one or more other locations. A playback tool (214) can communicate with the media server to determine a stream of video for the playback tool (214) to receive. The media server can include server-side controller logic for managing connections with one or more playback tools (214). A playback tool (214) receives the stream, buffers the received encoded data for an appropriate period, and begins decoding and playback.

III. Example Formats for HDR Video.

HDR video can be organized in any of various formats, which may vary in terms of bits per sample value, dynamic range, and color gamut. For example, an HDR video format can use 10 bits per sample value, 12 bits per sample value, or some other number of bits per sample value. The dynamic range of sample values in an HDR video format can be 0 nits to 1000 nits, 0 nits to 1500 nits, 0 nits to 4000 nits, 0 nits to 10000 nits, or some other dynamic range. Typically, the peak brightness for an HDR video format is at least 1000 nits. With respect to color gamut, HDR video typically has a wider color gamut than SDR video, which means the HDR video can potentially represent colors that are more saturated, or vivid.

The spatial resolution of HDR video can be 720p (1280 sample values×720 sample values), 1080p (1920 sample values×1080 sample values), UHD (3840 sample values× 2160 sample values), or some other number of sample values per picture. In general, a pixel is the set of one or more collocated sample values for a location in a picture, which may be arranged in different ways for different chroma sampling formats. Typically, before encoding, the sample values of video are converted to a color space such as YUV, in which sample values of a luma (Y) component represent brightness or intensity values, and sample values of chroma (U, V) components represent chroma values. The precise definitions of the chroma values (and conversion operations between a YUV-type color space and another color space such as an RGB-type color space) depend on implementation. In general, as used herein, the term YUV-type color space indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format). The term RGB-type color space indicates a color space that includes R, G, and B components in any order, which may be the color space used for a display device.

When image content is created for video, the signal captured by a camera (or multiple cameras, for some approaches to capturing HDR video) is converted from an optical signal to an electrical signal using an opto-electrical transfer function ("OETF"). In an example OETF, output values are assigned to input brightness values (in nits). For HDR video, one goal of the OETF is to maintain dynamic range and wide color gamut. Several OETFs have been described in format specifications, including S-Log3, ST 2084, and HLG.

In some example implementations, HDR video has 10 bits per sample value (e.g., HDR-10 format). The sample values are in a YUV-type color space with 4:2:0 chroma sampling format. Sample values are organized as a Y plane followed by an interleaved U/V plane with 2×2 subsampling.

FIG. 3 shows an example (300) that includes an OETF (310) for HDR video. In the example (300), output values are 10-bit sample values, for a range of 0 to 1023. Input values are brightness values in the range of 0 nits to 10000 nits. For the OETF (310), a relatively small range of input values up to a peak brightness for SDR video (e.g., from 0 nits to 100 nits) is assigned to a significant proportion of the range for output values (e.g., from 0 to 511). Within this range, dark values (e.g., from 0 nits to 2 nits) are represented with very fine gradations of output values (e.g., 0 to 200). This is an example of range expansion. The range of input values is assigned to a larger range of output values, which helps preserve details of dark values during later processing such as encoding.

Input values above the peak brightness for SDR video (e.g., above 100 nits) are assigned to the remaining range of output values (e.g., from 512 to 1023), with gradations between input values (per step in output value) becoming progressively wider as brightness values increase. For example, input values from 101 nits to 400 nits are assigned to output values in the range of 512 to 640, input values from 401 nits to 2000 nits are assigned to output values in the range of 641 to 768, and input values from 2001 nits to 10000 nits are assigned to output values in the range of 769 to 1023. The 1000 input values that are brightest (from 9000 nits to 10000 nits) may be represented with very small range of output values (e.g., 1014 to 1023). This is an example of range compression. A range of input values is assigned to a smaller range of output values, which helps preserve some details of bright values during later processing such as encoding, with more details being preserved for less bright values.

IV. Example Architectures for Rendering of HDR Video on EDR Display Devices.

When a video playback system receives HDR video, rendering of the HDR video on an HDR video display provides the highest quality. Many current display devices have a dynamic range less than HDR, however. Some of these non-HDR display devices are SDR display devices (e.g., having a peak brightness of 100 nits). Other non-HDR display devices have a higher peak brightness such as 400 nits or 600 nits, which provides "brightness headroom" within which details of bright values can be rendered. This section describes various aspects of example architectures for rendering HDR video on EDR display devices, which have a peak brightness above the typical peak brightness for an SDR display device (e.g., 100 nits) but below the typical peak brightness for a low-end HDR display device (e.g., 1000 nits).

A. Example Rendering Architectures.

FIG. 4 shows an example architecture for rendering of video on a target display device (490). In addition to the target display device (490) and media server (430), the example architecture includes a video playback system (400) with a data store (402), decision logic (410), streaming controller (420), input buffer (440), video decoder (450), tone mapper (470), first color converter (460) before the tone mapper (470), and second color converter (480) after the tone mapper (470). In the scenario shown in FIG. 4, HDR video is converted to EDR video for rendering on the target display device (490). In other scenarios, the target display device (490) supports HDR rendering, and the video playback system (400) provides HDR video to the target display device (490). In still other scenarios, the target display device (490) only supports SDR rendering, and the video playback system (400) provides SDR video to the target display device (490) or converts HDR video to SDR video for rendering on the target display device (490).

The target display device (490) can be a computer monitor, television screen, mobile device screen, or other type of display device that has a screen area. The target display device (490) can be an HDR display device, for example, having a spatial resolution of 1080p, UHD or higher, supporting a wide color gamut, and having a peak brightness of 1000 nits, 1500 nits, 4000 nits, or higher. Or, the target display device (490) can be an EDR display device, for example, having a spatial resolution of 720p, 1080p, UHD or higher, supporting a narrow color gamut, and having a peak brightness above 100 nits but below 1000 nits. Or, the target display device (490) can be an SDR display device, for example, having a spatial resolution of 720p, 1080p, UHD or higher, supporting a narrow color gamut, and having a peak brightness of 100 nits.

The target display device (490) can report various information (492) to the video playback system (400), including the peak brightness of the target display device (490), an ambient light level and/or ambient light color in the environment around the target display device (490) (e.g., from an ambient light sensor), or other information. Some of the information can be reported dynamically (e.g., ambient light level and/or ambient light color) while other information can be reported dynamically or at the time of installation (e.g., peak brightness of the target display device (490)).

The data store (402) is configured to store settings (404). For example, the settings (404) include information provided by the target display device (490), as well as information such as whether the target display device (490) is in a power-saving mode and whether brightness of the target display device (490) can be controlled programmatically. The data store (402) can provide the settings (404) to the decision logic (410) when requested. Other modules can interact with the data store (402) across an application programming interface ("API"), such as a graphics API of the operating system.

The decision logic (410) is configured to make various decisions about rendering, including the tone mapping mode to use and whether to request HDR video or SDR video. The decision logic (410) can consider various information to make the decisions. For example, the decision logic (410) is configured to receive an indication of a peak brightness of the target display device (490), e.g., as one of the settings (404) or directly from the target display device (490). Examples of other information considered by the decision logic (410) are described below. The decision logic (410) sends a decision (412) whether to request HDR video or SDR video to the streaming controller (420). In the scenario of FIG. 4, the decision logic (410) instructs the streaming controller (420) to request HDR video. The decision logic (410) also sends the selected tone mapping mode (414) to the tone mapper (470). In the scenario of FIG. 4, the selected tone mapping mode (414) is an HDR-to-EDR tone mapping mode.

In particular, to select the HDR-to-EDR tone mapping mode, the decision logic (410) is configured to determine if the peak brightness of the target display device (490) is above a typical peak brightness for an SDR display device and below a typical peak brightness for an HDR display device. To determine if the peak brightness of the target display device (490) is above the typical peak brightness for an SDR display device, the decision logic (410) can be configured to compare the peak brightness of the target display device (490) to a low peak brightness threshold, which is pre-defined to be at or above the typical peak brightness for an SDR display device. For example, the low peak brightness threshold is 100 nits, 200 nits, or 300 nits. To determine if the peak brightness of the target display device (490) is below the typical peak brightness for an HDR display device, the decision logic (410) can be configured to compare the peak brightness of the target display device (490) to a high peak brightness threshold, which is pre-defined to be at or below the typical peak brightness for an HDR display device (e.g., 800 nits, 1000 nits). In this way, the decision logic (410) can limit use of the HDR-to-EDR tone mapping mode to scenarios in which it is most beneficial.

The decision logic (410) can consider various other factors when making decisions about rendering.

For example, the decision logic (410) can be configured to determine a proportion of the screen area of the target display device (490) that is to be used for video rendering (e.g., full screen or some window area less than full screen). An indication of the proportion of the screen area that is to be used for video rendering can be reported as one of the settings (404) from the data store (402). The decision logic can compare the proportion of the screen area to a screen area threshold, which depends on implementation. For example, the threshold is 70%, 80%, 90%, or 100% (full screen). The selection of the HDR-to-EDR tone mapping mode by the decision logic (410) can be based at least in part on whether the proportion of the screen area is at or above the screen area threshold. In particular, the decision logic (410) can select the HDR-to-EDR tone mapping mode if the proportion of the screen area that is to be used for video rendering is at or above the screen area threshold, but otherwise select another mode (e.g., an HDR-to-SDR tone mapping mode or SDR-to-SDR tone mapping mode). In this way, use of the HDR-to-EDR tone mapping mode can be avoided when it would be distracting or unhelpful.

As another example, the decision logic (410) can be configured to determine whether a brightness level of the target display device (490) can be programmatically controlled using a brightness control signal (416). An indication of whether the brightness level of the target display device (490) can be programmatically controlled can be reported as one of the settings (404) from the data store (402). The decision logic (410) can select the HDR-to-EDR tone mapping mode based at least in part on whether the brightness level of the target display device (490) can be programmatically controlled. In particular, if the video playback system (400) is unable to programmatically control the target display device (490) with a brightness control signal (416), the decision logic (410) selects an HDR-to-SDR tone mapping mode (or SDR-to-SDR tone mapping mode), but does not select the HDR-to-EDR tone mapping mode. If the video playback system (400) cannot use the peak brightness of the target display device (490), the HDR-to-EDR tone mapping mode is not expected to be helpful. On the other hand, if the video playback system (400) is able to programmatically control the target display device (490) with a brightness control signal (416), the decision logic (410) may select the HDR-to-EDR tone mapping mode.

As another example, the decision logic (410) can be configured to determine whether the target display device (490) is in a power-saving mode. An indication of whether the target display device (490) is in a power-saving mode can be reported as one of the settings (404) from the data store (402). The decision logic (410) can select the HDR-to-EDR tone mapping mode based at least in part on whether the target display device (490) is in a power-saving mode. In particular, if the video playback system (400) is unable to increase the brightness level of the target display device (490) (due to use of the power-saving mode), the decision logic (410) selects an HDR-to-SDR tone mapping mode (or SDR-to-SDR tone mapping mode), but does not select the HDR-to-EDR tone mapping mode. On the other hand, if the video playback system (400) can increase the brightness level of the target display device (490) up to its peak brightness, the decision logic (410) may select the HDR-to-EDR tone mapping mode.

Based on the received information, the decision logic (410) selects a tone mapping mode from among multiple available tone mapping modes. In the scenario shown in FIG. 4, the selected tone mapping mode is an HDR-to-EDR tone mapping mode, in which input values for sample values of HDR video are mapped to output values for sample values of EDR video.

In other scenarios, if the peak brightness of the target display device (490) is at or above the typical peak brightness for an HDR display device, the decision logic (410) selects an HDR-to-HDR tone mapping mode from among the multiple available tone mapping modes. In the HDR-to-HDR tone mapping mode, input values for sample values of HDR video are not adjusted or are mapped, according to a tone mapping function adapted for HDR display, to sample values for HDR video.

In still other scenarios, if the peak brightness of the target display device (490) is at or below the typical peak brightness for an SDR display device, the decision logic (410) selects an HDR-to-SDR tone mapping mode from among the multiple available tone mapping modes. In the HDR-to-SDR tone mapping mode, input values for sample values of HDR video are mapped to output values for sample values of SDR video. Or, the decision logic (410) causes the streaming controller (420) to request encoded data for SDR video, which is decoded and rendered for playback.

The streaming controller (420) is configured to request encoded data for HDR video when so instructed by the decision logic (410). The streaming controller (420) is also configured to request encoded data for SDR video when so instructed by the decision logic (410). Thus, if the target display device is limited to SDR (e.g., due to a low peak brightness, or use of power-saving mode), the streaming controller (420) can request SDR video. Otherwise, the streaming controller (420) can request HDR video. Depending on the scenario, the streaming controller (420) can send a request for encoded data to the media server (430) or a media store (431). In the scenario shown in FIG. 4, the streaming controller (420) sends a request (422) for HDR video.

The media server (430) can be a Web server or other server, connected over a network, that stores encoded data for video and streams it to client systems for playback. The media server (430) can store encoded data for HDR video as well as encoded data for SDR video. In the scenario shown in FIG. 4, the media server (430) streams encoded data (432) for HDR video to the video playback system (400). In other scenarios, the media server (430) may stream encoded data (432) for SDR video to the video playback system (400).

If a media server (430) is not used, the video playback system (400) can retrieve encoded data from a media store (431). The media store (431) can be a magnetic disk, optical storage media, non-volatile memory, or other storage or memory, connected locally to the video playback system (400), that stores encoded data for video and provides it to the video playback system (400) for playback. The media store (431) can store encoded data for HDR video as well as encoded data for SDR video. Depending on the scenario, the media store (431) may provide encoded data for HDR video or encoded data for SDR video to the video playback system (400).

The input buffer (440) is configured to store the encoded data. The input buffer (440) provides encoded data (e.g., encoded data (432) for HDR video) to the video decoder (450). The video decoder is (450) configured to decode the encoded data, thereby producing sample values of video. In the scenario shown in FIG. 4, the video decoder decodes the encoded data (432) for HDR video and produces sample values (452) of HDR video. In other scenarios, the video decoder (450) decodes encoded data for SDR video and produces sample values of SDR video. Depending on implementation and the format of the encoded data, the video decoder (450) can decode the encoded data in a manner consistent with the H.265/HEVC standard, ISO/IEC 14496-10 standard (also known as H.264/AVC), another standard, or a proprietary format such as VP8 or VP9, or a variation or extension thereof. The video decoder (450) (or another module) can also provide metadata for the decoded video (e.g., metadata (454) for HDR video in FIG. 4) to the tone mapper (470).

The sample values (452) of HDR video are, for example, sample values in HDR-10 format. In this case, the sample values (452) are 10-bit sample values in a YUV-type color space, with a chroma sampling rate of 4:2:0. Alternatively, the sample values output by the video decoder (450) are in another format.

The color converter (460) is configured to convert sample values of decoded video from an initial color space to an intermediate color space. In particular, as pre-processing before HDR-to-EDR tone mapping, the color converter (460) is configured to convert the sample values (452) of HDR video from an initial color space to an intermediate color space, thereby producing intensity values and color values in the intermediate color space. For example, the initial color space is a YUV-type color space, and the intermediate color space is a perceptually uniform, hue linear color space such as IPT. In this case, the color converter (460) provides the intensity values in the intermediate color space as input values to the tone mapper (470), such that the output values from the tone mapper (470) are tone-mapped intensity values in the intermediate color space. The color values in the intermediate color space are not tone mapped, but may be adjusted as described below. Before color space conversion or as part of color space conversion, the color converter (460) may perform chroma sample rate upsampling, to restore chroma sample values to have the same resolution as luma sample values in the decoded video.

The tone mapper (470) is configured to apply tone mapping to input values for the sample values of decoded video, according to a tone mapping function, producing output values. When the selected tone mapping mode (414) is the HDR-to-EDR tone mapping mode, the tone mapper (470) is configured to apply tone mapping to input values for the sample values (452) of HDR video, and thereby produce output values for sample values (462) of EDR video. In this case, the input values to the tone mapper (470) are intensity values (462) for HDR video in an intermediate color space, produced by the color converter (460). The output values from the tone mapper are tone-mapped intensity values (472) for EDR video in the intermediate color space.

The tone mapping function is based at least in part on the peak brightness of the target display device (490) and the peak brightness of HDR video (possible according to the format of the HDR video, as opposed to a maximum sample value actually in the HDR video). The tone mapping function can also be based at least in part on metadata (454) provided by the video decoder (450) or another source, an indication of ambient light in an environment around the target display device (490), content type of the sample values (452) of HDR video, and/or analysis of the content of the sample values (452) of HDR video. Using these inputs, the tone mapper (470) adjusts the tone mapping function. Section V describes operations of the tone mapper (470) and example HDR-to-EDR tone mapping functions in some example implementations. If the selected tone mapping mode is an HDR-to-SDR tone mapping mode (or SDR-to-SDR tone mapping mode), the tone mapper (470) can apply an appropriate tone mapping function for SDR video to input values or skip tone mapping. If the selected tone mapping mode is an HDR-to-HDR tone mapping mode, the tone mapper (470) can apply an appropriate tone mapping function for HDR video to input values or skip tone mapping.

The tone mapper (470) can be configured to apply tone mapping on a region-by-region basis within a picture. For example, the tone mapper (470) uses a tone mapping function that varies from region-to-region within a picture, depending on the content of the picture, or even skips tone mapping for some regions of the picture. Or, the tone mapper (470) can be configured to apply tone mapping throughout a picture.

The tone mapper (470) can also be configured to adjust at least some of the color values (in the intermediate color space) depending on a ratio of original intensity value to tone-mapped intensity value, as further explained in Section V. In this way, the tone mapper (470) can compensate for desaturation caused by decreases in brightness of intensity values, which may make small differences between certain colors (e.g., light bluish colors) harder to perceive. Other color values can be passed through without adjustment.

The color converter (480) is configured to convert the tone-mapped intensity values (472) and color values (possible adjusted) in the intermediate color space for EDR video, from the intermediate color space to a final color space for the sample values (482) of EDR video. For example, the final color space is an RGB-type color space.

In the video playback system, the decision logic (410), tone mapper (470), and color converters (460, 480) can be organized as modules of a renderer. More generally, depending on implementation and the type of processing desired, modules of the video playback system (400) can be added, omitted, split into multiple modules, combined with other modules, and/or replaced with like modules. In alternative embodiments, video playback systems with different modules and/or other configurations of modules perform one or more of the described techniques. Specific embodiments of video playback systems typically use a variation or supplemented version of the video playback system (400). The relationships shown between modules within the video playback system (400) indicate general flows of information in the video playback system (400); other relationships are not shown for the sake of simplicity. In general, a given module of the video playback system (400) can be implemented by software executable on a CPU, by software controlling special-purpose hardware (e.g., a GPU or other graphics hardware for video acceleration), or by special-purpose hardware (e.g., in an ASIC). In particular, in some example implementations, tone mapping operations are performed using a general-purpose GPU (e.g., with shader instructions), and the decision logic (410) is implemented in software executable on a CPU.

B. Example Operations in Scenarios for Rendering of HDR Video on EDR Display Devices.

FIG. 5 shows a generalized technique (500) for rendering of HDR video on an EDR display device. A video playback system such as the video playback system (400) shown in FIG. 4 or other video playback system performs the technique (500).

The video playback system receives (510) an indication of a peak brightness of a target display device. For example, the peak brightness is 400 nits, 600 nits, or some other peak brightness for an EDR display device.

The video playback system determines (520) that the peak brightness of the target display device is above a typical peak brightness for a SDR display device and below a typical peak brightness for a HDR display device. For example, the video playback system uses decision logic as described with reference to FIG. 4 to make the determination.

The video playback system selects (530) an HDR-to-HDR tone mapping mode. In other examples (see below), the selected tone mapping mode may be another tone mapping mode.

The video playback system receives (540) encoded data for HDR video and decodes (550) the encoded data, thereby producing sample values of HDR video.

The video playback system applies (560) tone mapping to input values for the sample values of HDR video, according to a tone mapping function, thereby producing output values for sample values of EDR video. The tone mapping function is based at least in part on the peak brightness of the target display device. The tone mapping function can also be based at least in part on other factors, as described with reference to FIG. 4 and as further described in section V.

Figure 6A:
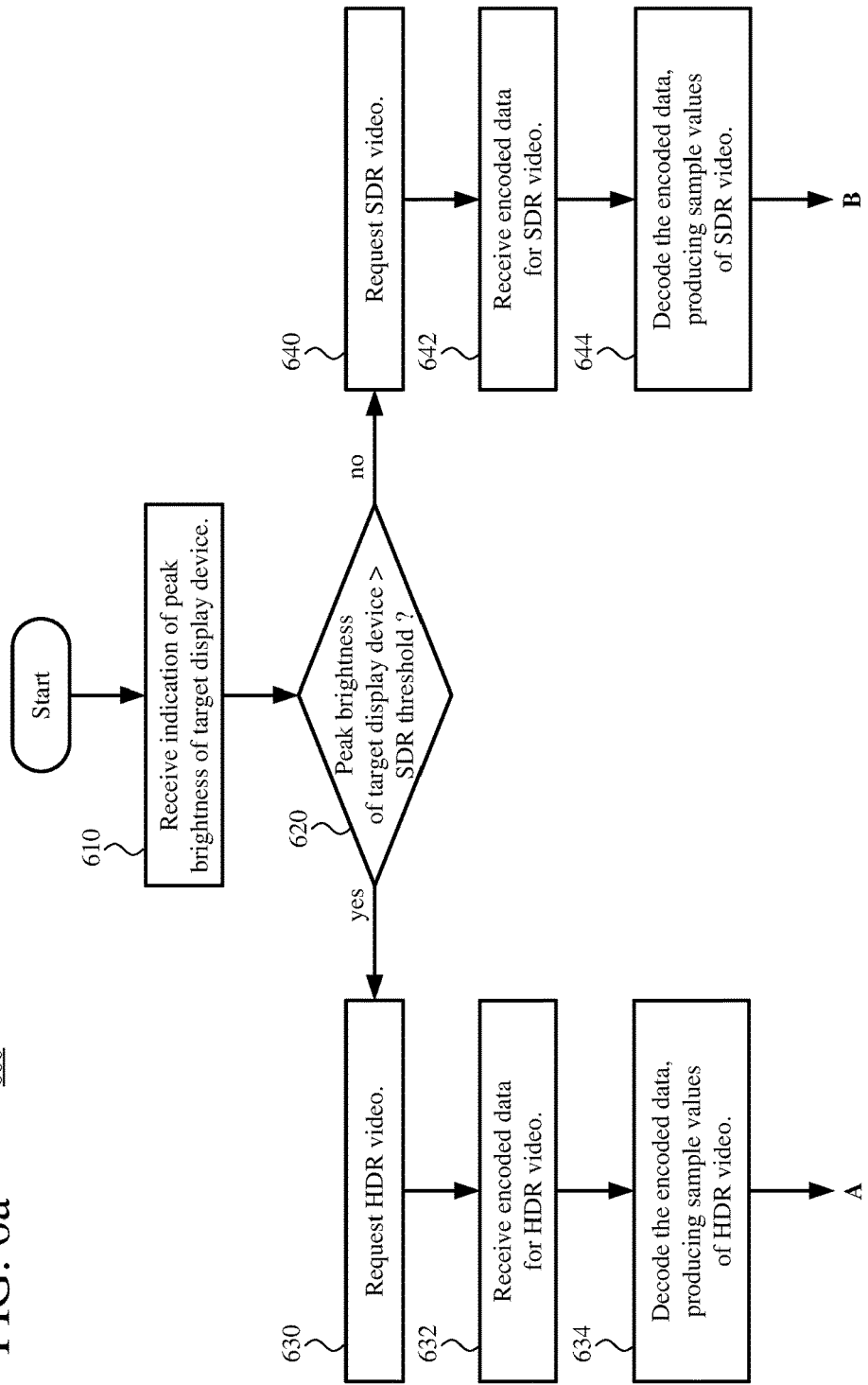
FIGS. 6a and 6b are flowcharts illustrating an example technique for rendering of video on an SDR display device, EDR display device, or HDR display device.
Figure 6B:
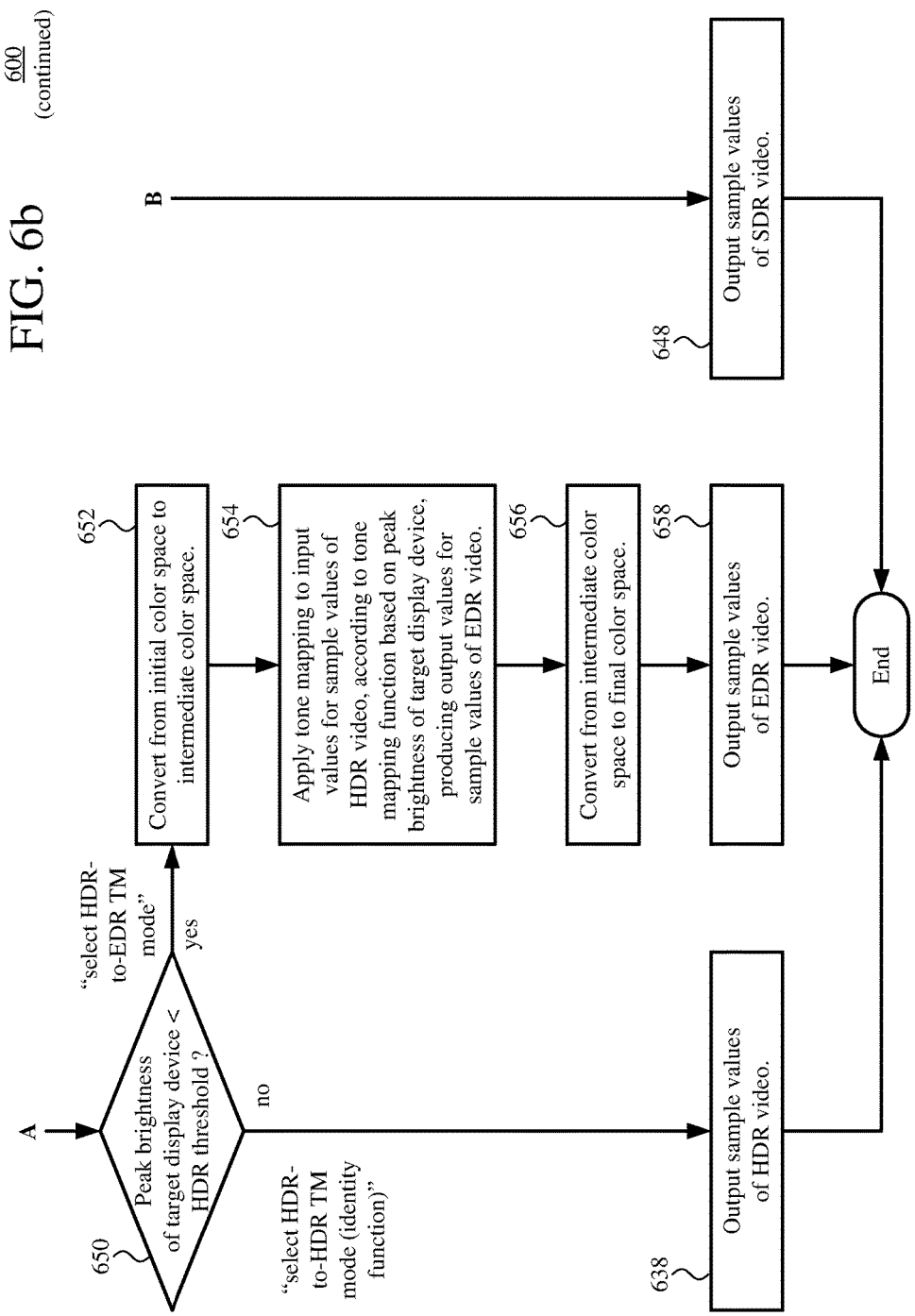

FIGS. 6a and 6b show an example technique (600) for rendering of video on an SDR display device, EDR display device, or HDR display device. A video playback system such as the video playback system (400) shown in FIG. 4 or other video playback system performs the technique (600).

The video playback system receives (610) an indication of a peak brightness of a target display device. For example, the peak brightness is 400 nits, 600 nits, or some other peak brightness for an EDR display device. Or, the peak brightness is 100 nits for an SDR display device. Or, the peak brightness is 1000 nits, 1500 nits, 4000 nits, or some other peak brightness for an HDR display device.

The video playback system checks (620) whether the peak brightness of the target display device is greater than a low peak brightness threshold, which is pre-defined to be at or above the typical peak brightness for an SDR display device. For example, the low peak brightness threshold is 100 nits, 200 nits, or 300 nits.

If the peak brightness of the target display device is less than the low peak brightness threshold ("no" branch at decision 620), the video playback system requests (640) SDR video (e.g., from a media server or local media source), receives (642) encoded data for the SDR video, and decodes (644) the encoded data, producing sample values of SDR video. After subsequent processing (e.g., color conversions, tone mapping), the video playback system outputs (648) sample values of SDR video (e.g., sample values in a final color space such as RGB).

On the other hand, if the peak brightness of the target display device is greater than the low peak brightness threshold ("yes" branch at decision 620), the video playback system requests (630) HDR video (e.g., from a media server or local media source), receives (632) encoded data for the HDR video, and decodes (634) the encoded data, producing sample values of HDR video. The video playback system checks (650) whether the peak brightness of the target display device is less than a high peak brightness threshold, which is pre-defined to be at or below the typical peak brightness for an HDR display device. For example, the high peak brightness threshold is 800 nits or 1000 nits.

If the peak brightness of the target display device is greater than the high peak brightness threshold ("no" branch at decision 650), the selected tone mapping mode is an HDR-to-HDR tone mapping mode. The HDR-to-HDR tone mapping mode can use an identity function, in which tone mapping operations are skipped, or other tone mapping function. In any case, after appropriate processing (e.g., color conversions, tone mapping), the video playback system outputs (638) sample values of HDR video (e.g., sample values in a final color space such as RGB).

On the other hand, if the peak brightness of the target display device is less than the high peak brightness threshold ("yes" branch at decision 650), the selected tone mapping mode is an HDR-to-EDR tone mapping mode. The video playback system converts (652) the sample values of HDR video from an initial color space (such as a YUV-type color space) to an intermediate color space (such as IPT or another perceptually uniform, hue linear color space), producing intensity values and color values in the intermediate color space for the HDR video. The video playback system applies (654) tone mapping to input values (here, intensity values in the intermediate color space) for the sample values of HDR video, according to a tone mapping function, thereby producing output values (here, tone-mapped intensity values in the intermediate color space) for sample values of EDR video. The tone mapping function is based at least in part on the peak brightness of the target display device. The tone mapping function can also be based at least in part on other factors, as described with reference to FIG. 4 and as further described in section V. The video playback system converts (656) the tone-mapped intensity values and color values (in the intermediate color space) to a final color space (e.g., an RGB-type color space). The video playback system outputs (658) sample values of EDR video in the final color space.

Figure 7A:
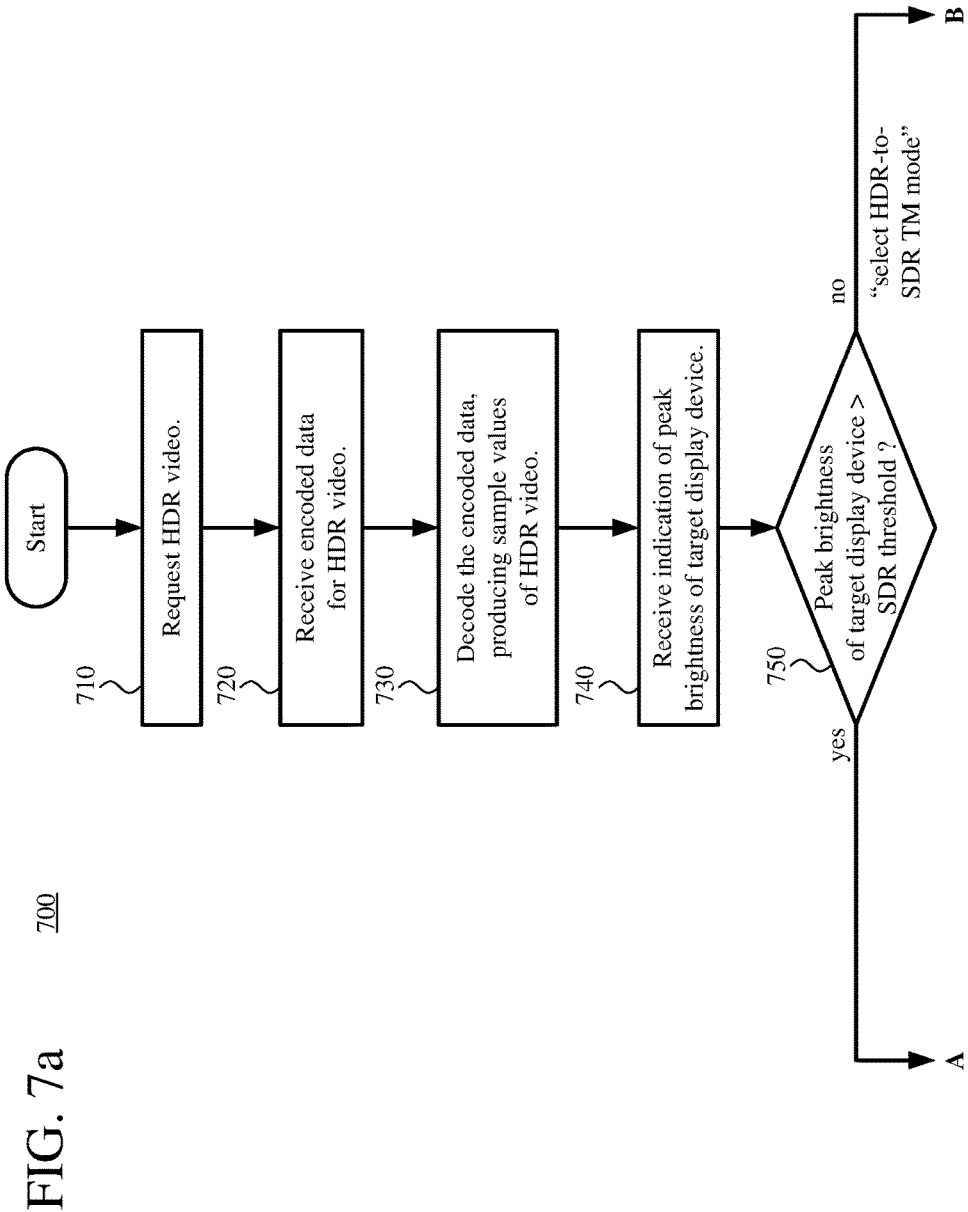
FIGS. 7a and 7b are flowcharts illustrating an example technique for rendering of HDR video on an SDR display device, EDR display device, or HDR display device.
Figure 7B:
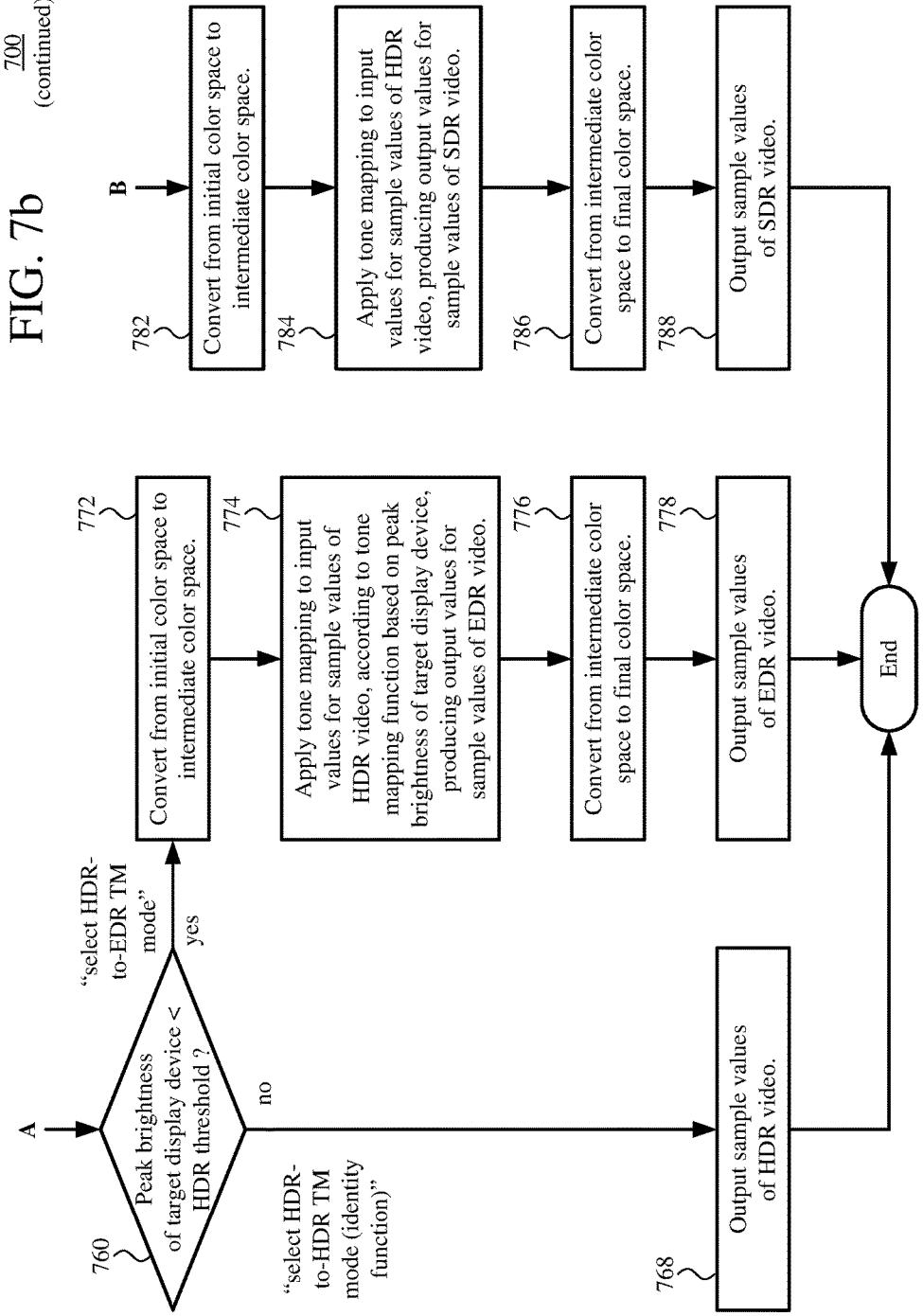

FIGS. 7a and 7b show an example technique (700) for rendering of HDR video on an SDR display device, EDR display device, or HDR display device. A video playback system such as the video playback system (400) shown in FIG. 4 or other video playback system performs the technique (700).

The video playback system requests (710) HDR video (e.g., from a media server or local media source), receives (720) encoded data for the HDR video, and decodes (730) the encoded data, producing sample values of HDR video. The video playback system also receives (740) an indication of a peak brightness of a target display device. For example, the peak brightness is 400 nits, 600 nits, or some other peak brightness for an EDR display device. Or, the peak brightness is 100 nits for an SDR display device. Or, the peak brightness is 1000 nits, 1500 nits, 4000 nits, or some other peak brightness for an HDR display device.

The video playback system checks (750) whether the peak brightness of the target display device is greater than a low peak brightness threshold, which is pre-defined to be at or above the typical peak brightness for an SDR display device. For example, the low peak brightness threshold is 100 nits, 200 nits, or 300 nits.

If the peak brightness of the target display device is less than the low peak brightness threshold ("no" branch at decision 750), the selected tone mapping mode is an HDR-to-SDR tone mapping mode. The video playback system converts (782) the sample values of HDR video from an initial color space to an intermediate color space, producing intensity values and color values in the intermediate color space for the HDR video. The video playback system applies (784) tone mapping to input values (here, intensity values in the intermediate color space) for the sample values of HDR video, according to a tone mapping function, thereby producing output values (here, tone-mapped intensity values in the intermediate color space) for sample values of SDR video. The video playback system converts (786) the tone-mapped intensity values and color values (in the intermediate color space) to a final color space (e.g., an RGB-type color space) and outputs (788) sample values of SDR video in the final color space.

On the other hand, if the peak brightness of the target display device is greater than the low peak brightness threshold ("yes" branch at decision 750), the video playback system checks (760) whether the peak brightness of the target display device is less than a high peak brightness threshold, which is pre-defined to be at or below the typical peak brightness for an HDR display device. For example, the high peak brightness threshold is 800 nits or 1000 nits.

If the peak brightness of the target display device is greater than the high peak brightness threshold ("no" branch at decision 760), the selected tone mapping mode is an HDR-to-HDR tone mapping mode. The HDR-to-HDR tone mapping mode can use an identity function, in which tone mapping operations are skipped, or other tone mapping function. In any case, after appropriate processing (e.g., color conversions, tone mapping), the video playback system outputs (768) sample values of HDR video (e.g., sample values in a final color space such as RGB).

On the other hand, if the peak brightness of the target display device is less than the high peak brightness threshold ("yes" branch at decision 760), the selected tone mapping mode is an HDR-to-EDR tone mapping mode. The video playback system converts (772) the sample values of HDR video from an initial color space (such as a YUV-type color space) to an intermediate color space (such as IPT or another perceptually uniform, hue linear color space), producing intensity values and color values in the intermediate color space for the HDR video. The video playback system applies (774) tone mapping to input values (here, intensity values in the intermediate color space) for the sample values of HDR video, according to a tone mapping function, thereby producing output values (here, tone-mapped intensity values in the intermediate color space) for sample values of EDR video. The tone mapping function is based at least in part on the peak brightness of the target display device. The tone mapping function can also be based at least in part on other factors, as described with reference to FIG. 4 and as further described in section V. The video playback system converts (776) the tone-mapped intensity values and color values (in the intermediate color space) to a final color space (e.g., an RGB-type color space). The video playback system outputs (778) sample values of EDR video in the final color space.

In the examples of FIGS. 6a, 6b, 7a, and 7b, the boundary condition for comparisons of peak brightness to thresholds is not addressed. The boundary condition (peak brightness of the target display device equals the threshold) can be handled according to the "yes" path or "no" path from a comparison decision, depending on implementation.

V. HDR-to-EDR Tone Mapping.

This section describes various aspects of tone mapping functions that can be used when rendering HDR video on an EDR display device. In general, a tone mapper accepts input values for sample values of video and applies a tone mapping function to produce output values for sample value of video. For HDR-to-EDR tone mapping, the tone mapper maps input brightness values for HDR video to output brightness values for EDR video.

The tone mapper can adapt its tone mapping function depending on various inputs, including a peak brightness of a target display device (here, an EDR display device), a peak brightness of HDR video, an ambient light level and/or ambient light color in the environment around the target display device, content type of the HDR video (as indicated by metadata), content of the HDR video (as indicated by analysis of the sample values of HDR video), and/or another factor.

A. Example HDR-to-EDR Tone Mapping Functions.

Figure 8:
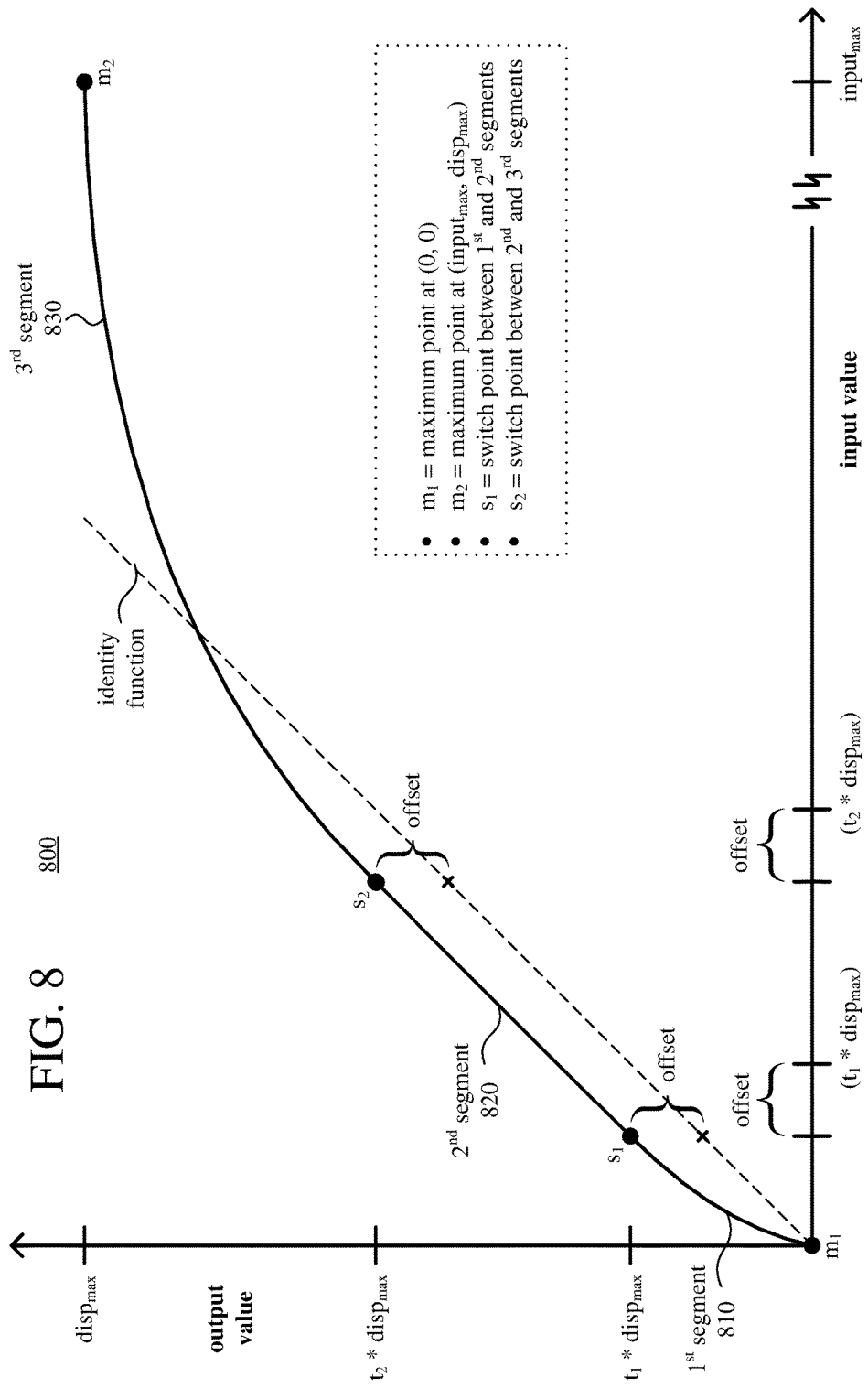
FIG. 8 is a diagram illustrating an example tone mapping function, which can be used for HDR-to-EDR tone mapping.

FIG. 8 shows an example tone mapping function (800) which can be used for HDR-to-EDR tone mapping. The tone mapping function (800) includes three segments, which collectively connect a minimum point $m_1$ to a maximum point $m_2$. Input values (along the horizontal axis) are mapped to corresponding output values (along the vertical axis) according to the tone mapping function (800).

The minimum point $m_1$ is set at the lowest input value and lowest output value. In FIG. 8, the minimum point $m_1$ is 0, 0, but the minimum point $m_1$ could have another value (e.g., 32, 16 if the lowest 32 input values and lowest 16 output values are not valid). The maximum point $m_2$ is set at the highest input value (input$_{max}$) and highest output value (disp$_{max}$). For HDR-to-EDR tone mapping, the tone mapper can set the maximum point $m_2$ based at least in part on a peak brightness of a target display device and peak brightness of HDR video. Thus, for HDR-to-EDR tone mapping, input$_{max}$ is the peak brightness of HDR video (e.g. 1000 nits, 1500 nits, 4000 nits) in a given format of HDR video, and disp$_{max}$ is the peak brightness of the target EDR display device (e.g., 400 nits, 600 nits). Input values are normalized to values (in nits) in the range from the lowest input value to the highest input value (that is, the highest possible input value), and output values are normalized to values in the range from the lowest output value to the highest output value.

The tone mapper is configured to set the tone mapping function (800) by setting various parameters, including a first switch point $s_1$, a second switch point $s_2$, and an offset. The first switch point $s_1$ separates a first segment (810) and second segment (820) of the tone mapping function (800). The second switch point $s_2$ separates the second segment (820) and a third segment (830) of the tone mapping function (800). The offset indicates a boost amount for the second segment (820). For reference, FIG. 8 shows a line (identity function) at which an output value equals the corresponding input value.

The tone mapper can set the first switch point $s_1$ based at least in part on the highest output value disp$_{max}$ (e.g., peak brightness of a target display device) and a first weight factor. In FIG. 8, the first switch point $s_1$ is set at the output value indicated by the weight factor $t_1$ times disp$_{max}$. The value of the weight factor $t_1$ depends on implementation. For example, weight factor $t_1$ is 0.15 or 0.2. At the first switch point $s_1$, the input value is the first weight factor times disp$_{max}$, minus the offset: $(t_1 *disp_{max})$–offset.

The tone mapper can set the second switch point $s_2$ based at least in part on the highest output value disp$_{max}$ (e.g., peak brightness of the target display device) and a second weight factor, which is larger than the first weight factor (for the first switch point $s_1$). In FIG. 8, the second switch point $s_2$ is set at the output value indicated by the weight factor $t_2$ times disp$_{max}$. The value of the weight factor $t_2$ depends on implementation. For example, weight factor $t_2$ is 0.45 or 0.5. At the second switch point $s_2$, the input value is the second weight factor times disp$_{max}$, minus the offset: $(t_2 *disp_{max})$–offset.

The offset can have a pre-defined value that does not depend on disp$_{max}$ (e.g., peak brightness for a target display device) or input$_{max}$ (e.g., peak brightness of HDR video). Or, the tone mapper can set the offset based at least in part on disp$_{max}$ (e.g., peak brightness of a target display device), input$_{max}$ (e.g., a peak brightness of HDR video), an ambient light level for an environment around the target display device, content type of the sample values of the video, and/or another factor.

The first segment (810) of the tone mapping function (800) begins at the minimum point $m_1$ and ends at a first switch point $s_1$. Input values along the first segment (810) are mapped to output values along the first segment (810) according to a first non-linear mapping. In general, the input values for the first segment (810) are dark values. In FIG. 8, the tone mapping function (800) expands the range of the dark values. That is, for the first segment (810), the difference between the highest input value (at the first switch point $s_1$) and lowest input value (at the minimum point $m_1$) is less than the difference between the highest output value (at the first switch point $s_1$) and lowest output value (at the minimum point $m_1$).

In FIG. 8, the first segment (810) of the tone mapping function (800) is configured such that the input values along the first segment (810) are boosted according to the first non-linear mapping, while the range of the input values along the first segment (810) is expanded. Thus, an input value is mapped to a brighter output value along the first segment (810). Typically, HDR video is mastered for a dark viewing environment and a full range of brightness values. Boosting of the dark input values makes them more visible in brighter viewing environments. As explained below, the boost amount (dependent on the offset for the second segment (820)) can be adjusted depending on ambient light level.

In some example implementations, the first non-linear mapping has a shape defined by a Bezier curve. In particular, the Bezier curve is a second-order rational Bezier curve parameterized by: (1) a first control point at the minimum point $m_1$; (2) a second control point, which is an intermediate point that controls the shape of the curve; (3) a third control point at the first switch point $s_1$; and (4) a weight. For the curve of the first segment (810) shown in FIG. 8, the intermediate point is located halfway between (along the axis for output values) the minimum point $m_1$ and first switch point $s_1$, and located at this position minus the offset along the axis for input values. Alternatively, the intermediate control point for the first segment (810) is located at some other position. The weight can be zero or have some other value derived by experiment. Alternatively, the first non-linear mapping (for the first segment (810)) has a shape defined by some other variation of Bezier curve (e.g., a first-order Bezier curve; a third-order Bezier curve; a Bezier curve without adjustable weights associated with a rational Bezier curve) or by some other type of curve (e.g., a B-spline or other spline).

The second segment (820) of the tone mapping function (800) begins at the first switch point $s_1$ and ends at a second switch point $s_2$. Input values along the second segment (820) are mapped to output values along the second segment (820) according to a linear mapping. In general, the input values for the second segment (820) are mid-range values. In FIG. 8, the second segment (820) of the tone mapping function (800) is configured such that the input values along the second segment (820) are boosted by the offset (set as described above) according to the linear mapping. The range of the input values is not compressed or expanded for the second segment (820), but it is shifted by the amount of the offset.

The third segment (830) of the tone mapping function (800) begins at the second switch point $s_2$ and ends at the maximum point $m_2$. Input values along the third segment (830) are mapped to output values along the third segment (830) according to a second non-linear mapping. In general, the input values for the third segment (830) are bright values, e.g., representing bright highlights in HDR video, above the typical peak brightness for SDR video. In FIG. 8, the tone mapping function (800) compresses the range of the bright sample values. That is, for the third segment (830), the difference between the highest input value (at the maximum point $m_2$) and the lowest input value (at the second switch point $s_2$) is greater than the difference between the highest output value (at the maximum point $m_2$) and lowest output value (at the second switch point $s_2$). For HDR-to-EDR tone mapping, this compresses bright highlights while preserving some detail.

In FIG. 8, the third segment (830) of the tone mapping function (800) is configured such that at least some of the input values along the third segment (830) are boosted according to the second non-linear mapping, while the range of the input values along the third segment (830) is compressed. Along the third segment (830), some (less bright) input values are boosted (increased) to brighter output values; other (brighter) input values are attenuated (decreased) to darker output values. Also, the "less bright" input values have more gradations in the output values than the "brighter" input values.

In some example implementations, the second non-linear mapping has a shape defined by a Bezier curve. In particular, the Bezier curve is a second-order rational Bezier curve parameterized by: (1) a first control point at the second switch point $s_2$; (2) a second control point, which is an intermediate point that controls the shape of the curve; (3) a third control point at the maximum point $m_2$; and (4) a weight. For the curve of the third segment (830) shown in FIG. 8, the intermediate point is located halfway between (along the axis for output values) the second switch point $s_2$ and the maximum point $m_2$, and located at this position plus the offset along the axis for input values. Alternatively, the intermediate control point for the third segment (830) is located in some other position. For the second non-linear mapping, the weight can be the ratio $disp_{max}/input_{max}$, e.g., ratio of the peak brightness of HDR video to the peak brightness of the target display device, or it can have some other value derived by experiment. Alternatively, the second non-linear mapping (for the third segment (830)) has a shape defined by some other variation of Bezier curve (e.g., a first-order Bezier curve; a third-order Bezier curve; a Bezier curve without adjustable weights associated with a rational Bezier curve) or by some other type of curve (e.g., a B-spline or other spline).

As explained above, along the first segment (810), dark input values are boosted. Along the second segment (820), mid-range input values are boosted. The boost amount can vary depending on ambient light level. For example, if the ambient light level is lower (viewing environment darker), the boost amount is lower. On the other hand, if the ambient light level is higher (viewing environment brighter), the boost amount is higher. The boost amount (offset) can also be adjusted depending on the content of the sample values of HDR video (as indicated through analysis of the values). Or, the boost amount (offset) can be adjusted depending on content type (e.g., game, sports, news, movie), as indicated through metadata, a user setting, etc. For example, the boost amount could be lower for "movie" or "news" content, and higher for "game" or "sports" content.

As explained above, the switch points $s_1$ and $s_2$ can be set based on $disp_{max}$ (e.g., peak brightness of target display device) and weight factors $t_1$ and $t_2$. The weight factors $t_1$ and $t_2$ can be pre-defined. Alternatively, by changing the weight factors $t_1$ and $t_2$, the switch points $s_1$ and $s_2$ can be set depending on the content of the sample values of HDR video (as indicated through analysis of the sample values). Or, by changing the weight factors $t_1$ and $t_2$, the switch points $s_1$ and $s_2$ can be set depending on the content type of the sample values of HDR video (e.g., game, sports, news, movie), as indicated through metadata, a user setting, etc. Changing the switch points $s_1$ and $s_2$ affects the sizes of the segments (810, 820, 830) and overall mapping behavior (expansion range for dark sample values; compression range for brighter sample values). For example, for a given boost amount (offset), setting a lower switch point between the first segment (810) and second segment (820) results a higher rate of range expansion for the darkest sample values. If HDR video include relatively many dark sample values (or preservation of details between dark sample values is favored for a content type), the switch point between the first segment (810) and second segment (820) can be lowered. For a given boost amount (offset), setting a higher switch point between the second segment (820) and third segment (830) results in a higher rate of range compression for the brightest sample values. If HDR video includes relatively few bright sample values (or preservation of details between bright sample values is not favored for a content type), the switch point between the second segment (820) and third segment (830) can be increased.

Also, various types of feedback from the target display device (e.g., ambient light level, ambient light color) can be used for more fine-grained control over HDR-to-EDR tone mapping. This can help manage power usage (e.g., lowering overall brightness if ambient light level is low).

B. Example Adjustments to Color Values.

In general, HDR-to-EDR tone mapping adjusts brightness values. If the brightness values are luma values in a YUV-type color space, correlations between luma values and chroma values may be problematic. In particular, adjustments to luma values through tone mapping may distort color hues after conversion back to RGB values, even when chroma components in the intermediate color space used for tone mapping operations are unchanged.

In some example implementations, sample values of HDR video are converted to a perceptually uniform (or hue linear) color space, for example, the IPT color space, before performing tone mapping operations. For example, YUV sample values for HDR video, which are output from a video decoder, are converted (after or in conjunction with chroma sample rate upsampling) to sample values in an RGB-type color space. The values can be linearized to nits. The sample values in the RGB-type color space are converted to sample values in XYZ color space (as defined in CIE 1931). The sample values in XYZ color space are converted to sample values in the IPT color space. This can involve a transform to LMS values, which are adjusted and transformed to the IPT color space. The IPT color space is an example of a perceptually uniform (or hue linear) color space, in which sample values include intensity (I) values and color values, with one color value (P) representing a value along a red-green dimension, and the other color value (T) representing a value along a yellow-blue dimension. For HDR-to-EDR tone mapping, the intensity (I) values are tone mapped.

The color (P, T) values are not tone mapped, but they may be adjusted to compensate for loss of detail (perceptually) introduced by tone mapping. Although I, P and T values are decorrelated, boosting of intensity values during tone mapping may cause "whitening" (desaturation). The perceived desaturation can make colors appear less vivid and make small differences between certain colors (e.g., light bluish colors) more difficult to perceive. To compensate for this, P and T values may be selectively adjusted, depending on hue. For example, for all hues, P and T values are saturated, but P and T values for some hues (e.g., bluish hues) are saturated more aggressively. Otherwise, the colors for those hues are too dull (e.g., significantly light blue colors are likely to be perceived as white colors). Alternatively, P and T values for some hues (e.g., bluish hues) are saturated, while P and T values for other hues are not adjusted at all.

In some example implementations, P and T values are selectively adjusted depending on the ratio of original intensity value ($I_{input}$) to tone-mapped intensity value ($I_{TM}$). This increases selected P and T values in order to make colors more vivid (saturated).

After tone mapping, the tone-mapped intensity values and color values (possibly adjusted) are for sample values of EDR video. The tone-mapped intensity values and color values (possibly adjusted) are converted to an RGB-type color space specific to the display device.

Alternatively, HDR-to-EDR tone mapping can be performed on luma values in a YUV-type color space or other color space.

C. Example HDR-to-EDR Tone Mapping Operations.

Figure 9:
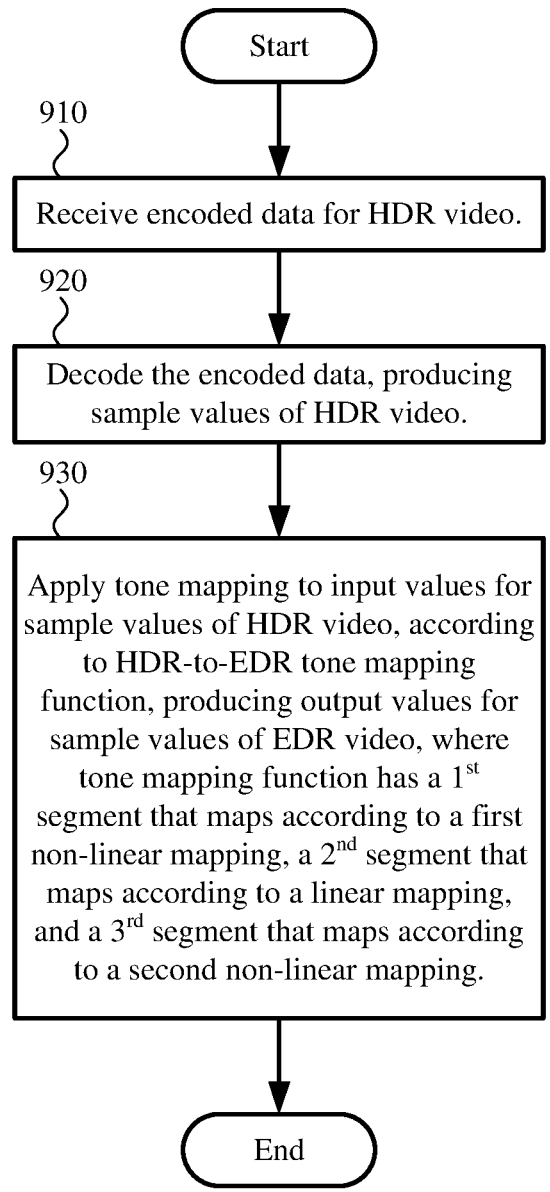
FIG. 9 is a flowchart illustrating a generalized technique for rendering of video on an EDR display device, using an HDR-to-EDR tone mapping function.

FIG. 9 shows a generalized technique (900) for rendering of video on an EDR display device, using an HDR-to-EDR tone mapping function. A video playback system such as the video playback system (400) shown in FIG. 4 or other video playback system performs the technique (900).

The video playback system receives (910) encoded data for HDR video and decodes (920) the encoded data, thereby producing sample values of HDR video. The video playback system then applies (930) tone mapping to input values for the sample values of HDR video, according to a tone mapping function, to produce output values for sample values of EDR video. For example, the input values are intensity values in an intermediate color space (such as IPT or another perceptually uniform, hue linear color space), and the output values are tone-mapped intensity values.

In some example implementations, a first segment of the tone mapping function begins at a minimum point and ends at a first switch point. Input values along the first segment are mapped to output values along the first segment according to a first non-linear mapping. A second segment of the tone mapping function begins at the first switch point and ends at a second switch point. Input values along the second segment are mapped to output values along the second segment according to a linear mapping. A third segment of the tone mapping function begins at the second switch point and ends at a maximum point. Input values along the third segment are mapped to output values along the third segment according to a second non-linear mapping. The tone mapping function can be parameterized as described with reference to FIG. 8. Alternatively, the tone mapping function is defined in some other way.

Figure 10:
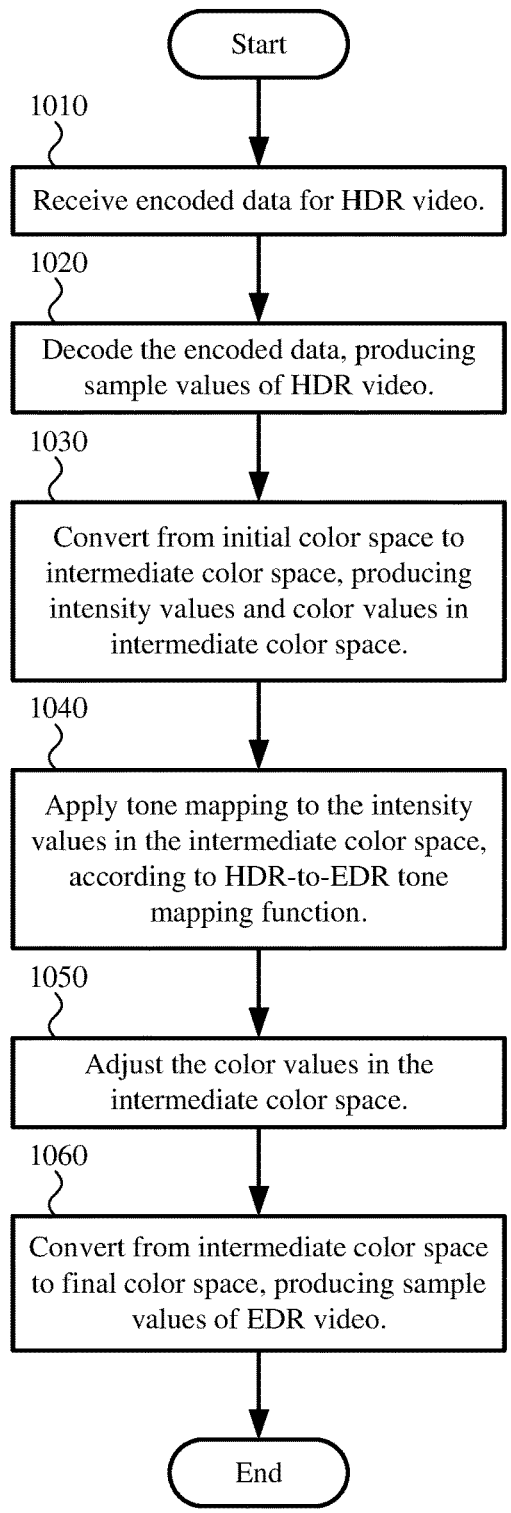
FIG. 10 is a flowchart illustrating an example technique for rendering of video on an EDR display device, using an HDR-to-EDR tone mapping function.

FIG. 10 shows an example technique (1000) for rendering of video on an EDR display device, using an HDR-to-EDR tone mapping function. A video playback system such as the video playback system (400) shown in FIG. 4 or other video playback system performs the technique (1000).

The video playback system receives (1010) encoded data for HDR video and decodes (1020) the encoded data, thereby producing sample values of HDR video.

The video playback system then converts (1030) the sample values of HDR video from an initial color space (e.g., a YUV-type color space) to an intermediate color space (e.g., a perceptually uniform, hue linear color space such as IPT). This produces intensity values and color values in the intermediate color space.

The video playback system then applies (1040) tone mapping to input values for the sample values of HDR video, according to an HDR-to-EDR tone mapping function. This produces output values for sample values of EDR video. In particular, the input values are intensity values in an intermediate color space (such as IPT or another perceptually uniform, hue linear color space), and the output values are tone-mapped intensity values. The tone mapping function can include segments as described with reference to FIG. 8.

The video playback system selectively adjusts (1050) color values in the intermediate color space. For example, the video playback system selectively saturates color values for some hues in the intermediate color space, as described in section V.B.

Finally, the video playback system converts (1060) the tone-mapped intensity values and color values (selectively-adjusted) from the intermediate color space to a final color space (e.g., an RGB-type color space). This produces sample values of EDR video in the final color space.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, wherein the computer system implements a video playback system that includes:
   decision logic configured to:
      receive an indication of a peak brightness of a target display device;
      determine if the peak brightness of the target display device is above a first peak brightness threshold and below a second peak brightness threshold, wherein the first peak brightness threshold is defined to be at or above a peak brightness of 100 nits, for a standard dynamic range ("SDR") display device, and wherein the second peak brightness threshold is defined to be at or below a peak brightness of 4000 nits, for a high dynamic range ("HDR") display device; and
      if so, select an HDR-to-enhanced dynamic range ("EDR") tone mapping mode;
   a streaming controller configured to request encoded data for HDR video;
   an input buffer configured to store the encoded data;
   a video decoder configured to decode the encoded data, and thereby produce sample values of HDR video; and
   a tone mapper configured to apply tone mapping to input values for the sample values of HDR video, according to a tone mapping function that is based at least in part on the peak brightness of the target display device, and thereby produce output values for sample values of EDR video.

2. The computer system of claim 1, wherein, to determine if the peak brightness of the target display device is above the first peak brightness threshold, the decision logic is configured to:
compare the peak brightness of the target display device to the first peak brightness threshold, wherein the first peak brightness threshold is selected from the group consisting of 100 nits, 200 nits, and 300 nits.

3. The computer system of claim 1, wherein, to determine if the peak brightness of the target display device is below the second peak brightness threshold, the decision logic is configured to:
compare the peak brightness of the target display device to the second peak brightness threshold, wherein the second peak brightness threshold is selected from the group consisting of 800 nits and 1000 nits.

4. The computer system of claim 1, wherein the target display device has a screen area, and wherein the decision logic is further configured to:
determine a proportion of the screen area that is to be used for video rendering; and
compare the proportion of the screen area to a screen area threshold, wherein the selection of the HDR-to-EDR tone mapping mode is also based at least in part on whether the proportion of the screen area is at or above the screen area threshold.

5. The computer system of claim 1, wherein the decision logic is further configured to:
determine whether a brightness level of the target display device can be programmatically controlled, wherein the selection of the HDR-to-EDR tone mapping mode is also based at least in part on whether the brightness level of the target display device can be programmatically controlled.

6. The computer system of claim 1, wherein the decision logic is further configured to:
determine whether the target display device is in a power-saving mode, wherein the selection of the HDR-to-EDR tone mapping mode is also based at least in part on whether the target display device is in the power-saving mode.

7. The computer system of claim 1, wherein the tone mapping function is also based at least in part on one or more of:
peak brightness of HDR video;
metadata provided by the video decoder;
an indication of ambient light in an environment around the target display device;
content type of the sample values of HDR video; and
analysis of content of the sample values of HDR video.

8. The computer system of claim 1, wherein the HDR-to-EDR tone mapping mode is selected from among multiple available tone mapping modes.

9. The computer system of claim 8, wherein the decision logic is further configured to:
if the peak brightness of the target display device is below the first peak brightness threshold, select an HDR-to-SDR tone mapping mode, among the multiple available tone mapping modes, in which the input values for the sample values of HDR video are mapped to output values for sample values of SDR video; and
if the peak brightness of the target display device is above the second peak brightness threshold, select an HDR-to-HDR tone mapping mode, among the multiple available tone mapping modes, in which the input values for the sample values of HDR video are not adjusted or are mapped to output values for sample values of HDR video.

10. The computer system of claim 8, wherein the decision logic is further configured to:
if the peak brightness of the target display device is below the first peak brightness threshold, cause the streaming controller to request encoded data for SDR video; and
if the peak brightness of the target display device is above the second peak brightness threshold, select an HDR-to-HDR tone mapping mode, among the multiple available tone mapping modes, in which the input values for the sample values of HDR video are not adjusted or are mapped to output values for sample values of HDR video.

11. The computer system of claim 1, wherein the video playback system further includes:
a color converter configured to convert the sample values of HDR video from an initial color space to an intermediate color space, and thereby produce intensity values and color values in the intermediate color space.

12. The computer system of claim 11, wherein the initial color space is a YUV-type color space, and the intermediate color space is a perceptually uniform, hue linear color space.

13. The computer system of claim 11, wherein the input values for the tone mapping are the intensity values in the intermediate color space but not the color values in the intermediate color space, and wherein the output values from the tone mapping are tone-mapped intensity values in the intermediate color space.

14. The computer system of claim 13, wherein the tone mapper or another module of the video playback system is configured to:
adjust at least some of the color values in the intermediate color space depending on a ratio of original intensity value to tone-mapped intensity value.

15. The computer system of claim 13, wherein the video playback system further includes:
a second color converter configured to convert the tone-mapped intensity values and the color values from the intermediate color space to a final color space for the sample values of EDR video.

16. The computer system of claim 1, wherein the tone mapper is configured to apply the tone mapping on a region-by-region basis within a picture.

17. The computer system of claim 1, wherein the tone mapper is configured to apply the tone mapping throughout a picture.

18. The computer system of claim 1, wherein:
a first segment of the tone mapping function begins at a minimum point and ends at a first switch point, wherein input values along the first segment are boosted according to a first non-linear mapping while range of the input values along the first segment is expanded;
a second segment of the tone mapping function begins at the first switch point and ends at a second switch point, wherein input values along the second segment are boosted by an offset according to a linear mapping; and
a third segment of the tone mapping function begins at the second switch point and ends at a maximum point, wherein at least some input values along the third segment are boosted according to a second non-linear mapping while range of the input values along the third segment is compressed.

19. In a computer system, a method comprising:
receiving an indication of a peak brightness of a target display device;
determining that the peak brightness of the target display device is above a first peak brightness threshold and below a second peak brightness threshold, wherein the first peak brightness threshold is defined to be at or above a peak brightness of 100 nits, for a standard dynamic range ("SDR") display device, and wherein the second peak brightness threshold is defined to be at or below a peak brightness of 4000 nits, for a high dynamic range ("HDR") display device;
selecting an HDR-to-enhanced dynamic range ("EDR") tone mapping mode;
receiving encoded data for HDR video;
decoding the encoded data, thereby producing sample values of HDR video; and
applying tone mapping to input values for the sample values of HDR video, according to a tone mapping function that is based at least in part on the peak brightness of the target display device, thereby producing output values for sample values of EDR video.

20. One or more computer-readable media storing computer-executable instructions for causing a computer system, when programmed thereby, to perform operations comprising:
receiving an indication of a peak brightness of a target display device;
determining that the peak brightness of the target display device is above a first peak brightness threshold and below a second peak brightness threshold, wherein the first peak brightness threshold is defined to be at or above a peak brightness of 100 nits, for a standard dynamic range ("SDR") display device, and wherein the second peak brightness threshold is defined to be at or below a typical peak brightness of 4000 nits, for a high dynamic range ("HDR") display device;
selecting an HDR-to-enhanced dynamic range ("EDR") tone mapping mode;
receiving encoded data for HDR video;
decoding the encoded data, thereby producing sample values of HDR video; and
applying tone mapping to input values for the sample values of HDR video, according to a tone mapping function that is based at least in part on the peak brightness of the target display device, thereby producing output values for sample values of EDR video.

* * * * *